(12) United States Patent
Kim et al.

(10) Patent No.: US 8,543,479 B2
(45) Date of Patent: Sep. 24, 2013

(54) SYSTEM FOR OPERATING INVESTMENT MONEY

(75) Inventors: Chul Min Kim, Koyang-si (KR); Bum Sik Jeong, Seoul (KR); Young Jun Gho, Seoul (KR); Jung Sik Yu, Seoul (KR)

(73) Assignee: Samsung Securities Co., Ltd. (KR)

( * ) Notice: Subject to any disclaimer, the term of this patent is extended or adjusted under 35 U.S.C. 154(b) by 2 days.

(21) Appl. No.: 13/060,455

(22) PCT Filed: Oct. 26, 2010

(86) PCT No.: PCT/KR2010/007391
§ 371 (c)(1),
(2), (4) Date: Mar. 4, 2011

(87) PCT Pub. No.: WO2012/002619
PCT Pub. Date: Jan. 5, 2012

(65) Prior Publication Data
US 2012/0005120 A1 Jan. 5, 2012

(30) Foreign Application Priority Data
Jun. 30, 2010 (KR) .................. 10-2010-0062964

(51) Int. Cl.
*G06Q 40/00* (2012.01)
(52) U.S. Cl.
USPC ...................................... 705/36 R
(58) Field of Classification Search
USPC ................................ 705/36 R, 37
See application file for complete search history.

(56) References Cited

U.S. PATENT DOCUMENTS 7,359,876 B1 * 4/2008 Redpath et al. ............. 705/37

FOREIGN PATENT DOCUMENTS

KR 10-2002-0049782 6/2002
KR 1020020049782 A 6/2002

(Continued)

OTHER PUBLICATIONS

Ibbotson Product Support: Monte Carlo Simulation, Apr. 2005, Ibbostson Associates, Chicago, IL., pp. 1-6.*

(Continued)

*Primary Examiner* — Bijendra K Shrestha
(74) *Attorney, Agent, or Firm* — Ohlandt Greeley Ruggiero & Perle L.L.P.

(57) ABSTRACT

The present disclosure is directed to systemically arranging a computation module communicating with a client information processor and receiving client setup information input/set by a client, a computation module selecting a product invested at each turn (of the IM investment period) and a product invested at the last turn (the last turn of the investment period) from among the investment products operated by an IM management server, according to the received client setup information, generating an IM operation simulation data reflecting the total expected cash input demanded on the client, the expected cash input at each/last turn for the product invested at each/last turn, the expected cash output at each turn resulting from the purchase/operation of the product invested at each turn, the expected cash output at the last turn resulting from the purchase/operation of the product invested at the last turn, the purchase quantity of the product invested at each turn to match the expected cash output at each turn, the purchase quantity of the product invested at the last turn to match the expected cash output at the last turn, etc. by simulating in advance the selected product invested at each/last turn according to the features of the products, and notifying the generated IM operation simulation data to the client information processor, a computation module, in response to a client approval data for the IM operation simulation data, transmitting the IM operation simulation data to the IM management server so as to allow the client to be paid the <expected cash output at each turn> not less than a predetermined amount at each turn of the IM investment period and to be paid the expected cash output at the last turn comparable to the principal of the IM at the last turn of the IM investment period.

12 Claims, 26 Drawing Sheets

(56) References Cited

FOREIGN PATENT DOCUMENTS

| KR | 10-2006-0099345 | | 9/2006 |
| --- | --- | --- | --- |
| KR | 1020060099345 | A | 9/2006 |
| KR | 10-2007-0030570 | | 3/2007 |
| KR | 1020070030570 | A | 3/2007 |
| KR | 10-2009-0004400 | | 1/2009 |
| KR | 1020090004400 | A | 1/2009 |
| WO | WO 2005/079157 | * | 9/2005 |

OTHER PUBLICATIONS

Jegadeesh et al.: Risk and Expected Return of Private Equity Investments: Evidence based on Market Prices, Mar. 2009, pp. 1-44.*
International Search Report dated Jul. 8, 2011 in counterpart International Application No. PCT/KR2010/007391.
International Search Report Dated Jul. 8, 2011 From Application No. PCT/KR2010/007391.

* cited by examiner

SYSTEM FOR OPERATING INVESTMENT MONEY

TECHNICAL FIELD

The present disclosure relates to a system for operating investment money (IM) entrusted by a client. More particularly, it relates to an IM operating system allowing a client (a person or a company) to be regularly paid a bonus money not less than a predetermined amount at every turn of investment while guaranteeing the investment principal, thus greatly improving the business competitiveness of the IM manager (e.g., securities company, bank, insurance company, etc.) as well as the client's investment satisfaction.

BACKGROUND ART

For convenience's sake, the terms used in this specification will be defined first.
1. Investment product: A financial product in which a client's investment money (IM) is invested, for example, money market fund, repurchase agreement, cash management account (CMA), government bond, municipal bond, guaranteed bond, financial bond, investment-grade corporate bond, bond-type fund, principal-protected equity-linked securities (ELS), non-investment-grade bond, stock, non-principal-protected ELS, indexed equity fund, active equity fund, derivative, investment fund, margin trading, equity-linked warrant (ELW), and futures/option. (2) Investment period: The period from the investment start date (or month) of the client's IM until the investment maturity date (or month) (e.g., 1 year, 3 years, 5 years, etc.). (3) Turn (of investment): The regular turns of investment belonging to the investment period (e.g., 1 year, 3 years, 5 years, etc.) of the client's IM. For example, the turns may recur monthly or bimonthly. To generalize, the turns may recur once in N monthly. For example, if the investment period of the client's IM is one year, from January 1, 20XX until December 31, 20XX, and if the turns are set bimonthly, the first turn is February of 20XX, the second turn is April of 20XX, and the third turn is May of 20XX. (4) Last turn (of investment): The turn corresponding to the maturity date (or month) of the client's IM. For example, if the investment period of the client's IM is one year, from January 1, 20XX until December 31, 20XX, and if the turns are set bimonthly, the first turn is February of 20XX, the second turn is April of 20XX, the third turn is June of 20XX, the fourth turn is August of 20XX, the fifth turn is October of 20XX, and the sixth turn is December of 12. In this case, the sixth turn is the last turn. (5) Product invested at each turn: A particular investment product in which the client's IM is invested at each turn among the investment products whose maturity date arrives at every turn. For example, if the investment period of the client's IM is one year, from January 1, 20XX until December 31, 20XX, and if the turns are set bimonthly, the first turn is February of 20XX, the second turn is April of 20XX, and the third turn is May of 20XX. In this case, the product invested at the first turn means a particular investment product in which the client's IM is invested in February of 20XX, and the product invested at the second turn means a particular investment product in which the client's IM is invested in April of 20XX. (6) Product invested at the last turn: A particular investment product in which the client's IM is invested at the last turn among the investment products whose maturity date arrives at the last turn. For example, if the investment period of the client's IM is one year, from January 1, 20XX until December 31, 20XX, and if the turns are set bimonthly, the last turn (i.e., the sixth turn) is December of 20XX. In this case, the product invested at the last turn means a particular investment product in which the client's IM is invested at the sixth turn, i.e. in December of 20XX. (7) Expected cash input at each turn: Expected cash input required to purchase the product invested at each turn. For example, if the investment period of the client's IM is one year, from January 1, 20XX until December 31, 20XX, and if the turns are set bimonthly, the first turn is February of 20XX, the second turn is April of 20XX, and the third turn is May of 20XX. Then, the product invested at the first turn means a particular investment product in which the client's IM is invested in February of 20XX, and the product invested at the second turn means a particular investment product in which the client's IM is invested in April of 20XX. In this case, the expected cash input at the first turn means the expected cash input required to purchase the product invested at the first turn, and the expected cash input at the second turn means the expected cash input required to purchase the product invested at the second turn. (8) Expected cash input at the last turn: Expected cash input required to purchase the product invested at the last turn. For example, if the investment period of the client's IM is one year, from January 1, 20XX until December 31, 20XX, and if the turns are set bimonthly, the last turn (i.e., the sixth turn) is December of 20XX. Then, the product invested at the last turn is a particular investment product in which the client's IM is invested at the sixth turn, i.e. in December of 20XX. In this case, the expected cash input at the last turn means the expected cash input required to purchase the product invested at the sixth turn. (9) Unit price of the product invested at each turn at maturity: Unit price of the product invested at each turn on the maturity date. For example, if the investment period of the client's IM is one year, from January 1, 20XX until December 31, 20XX, and if the turns are set bimonthly, the first turn is February of 20XX, and the second turn is April of 20XX. Then, the product invested at the first turn is a particular investment product in which the client's IM is invested in February of 20XX, and the product invested at the second turn is a particular investment product in which the client's IM is invested in April of 20XX. In this case, the unit price of the product invested at the first turn at maturity means the unit price of the product invested at the first turn whose maturity date arrives in February of 20XX on the maturity date, and the unit price of the product invested at the second turn at maturity means the unit price of the product invested at the second turn whose maturity date arrives in April of 20XX on the maturity date. (10) Purchase quantity of the product invested at each turn: The purchase quantity of the product invested at each turn. For example, if the investment period of the client's IM is one year, from January 1, 20XX until December 31, 20XX, and if the turns are set bimonthly, the first turn is February of 20XX, and the second turn is April of 20XX. Then, the product invested at the first turn is a particular investment product in which the client's IM is invested in February of 20XX, and the product invested at the second turn is a particular investment product in which the client's IM is invested in April of 20XX. In this case, the purchase quantity of the product invested at the first turn means the purchase quantity of the product invested at the first turn whose maturity date arrives in February of 20XX, and the purchase quantity of the product invested at the second turn means the purchase quantity of the product invested at the second turn whose maturity date arrives in April of 20XX. (11) Unit price of the product invested at the last turn at maturity: Unit price of the product invested at the last turn on the maturity date. For example, if the investment period of the client's IM is one year, from January 1, 20XX until December 31, 20XX, and if the turns are set bimonthly, the last turn (i.e., the sixth turn) is December of 20XX. Then, the product invested at the last turn is a particular investment product in which the client's IM is invested at the sixth turn, i.e. in December of 20XX. In this case, the unit price of the product invested at the last turn at maturity means the unit price of the product invested at the sixth turn whose maturity date arrives in December of 20XX on the maturity date. (12) Purchase quantity of the product invested at the last turn: The purchase quantity of the product invested at the last turn. For example, if the investment period of the client's IM is one year, from January 1, 20XX until December 31, 20XX, and if the turns are set bimonthly, the last turn (i.e., the sixth turn) is December of 20XX. Then, the product invested at the last turn is a particular investment product in which the client's IM is invested at the sixth turn, i.e. in December of 20XX. In this case, the purchase quantity of the product invested at the last turn means the purchase quantity of the product invested at the sixth turn whose maturity date arrives in December of 20XX. (13) Expected cash output at each turn (set as the amount desired by the client or automatically computed by the system): Expected amount of money to be paid to a client who purchased a product invested at each turn when he/she sells the product invested at the last turn on the maturity date. For example, if the investment period of the client's IM is one year, from January 1, 20XX until December 31, 20XX, and if the turns are set bimonthly, the first turn is February of 20XX, and the second turn is April of 20XX. Then, the product invested at the first turn is a particular investment product in which the client's IM is invested in February of 20XX, and the product invested at the second turn is a particular investment product in which the client's IM is invested in April of 20XX. In this case, the expected cash output at the first turn means the expected amount of money to be paid to a client who purchased the product invested at the first turn whose maturity date arrives in February of 20XX when he/she sells the product invested at the first turn on the maturity date of the investment product, and the expected cash output at the second turn means the expected amount of money to be paid to a client who purchased the product invested at the second turn whose maturity date arrives in April of 20XX when he/she sells the product invested at the second turn on the maturity date of the investment product. (14) Expected cash output at the last turn (set as the amount desired by the client or automatically computed by the system): Expected amount of money to be paid to a client who purchased a product invested at the last turn when he/she sells the product invested at the last turn on the maturity date. For example, if the investment period of the client's IM is one year, from January 1, 20XX until December 31, 20XX, and if the turns are set bimonthly, the last turn (i.e., the sixth turn) is December of 20XX. Then, the product invested at the last turn is a particular investment product in which the client's IM is invested at the sixth turn, i.e. in December of 20XX. In this case, the expected cash output at the last turn means the expected amount of money to be paid to a client who purchased the product invested at the sixth turn whose maturity date arrives in December of 20XX when he/she sells the product invested at the sixth turn on the maturity date of the investment product. (15) Grace period: A deposit period during which the expected cash output at each turn is deposited without being paid. (16) Unit purchase price of the product invested at each turn: Unit price of the product invested at each turn on the date of purchase. For example, if the investment period of the client's IM is one year, from January 1, 20XX until December 31, 20XX, and if the turns are set bimonthly, the first turn is February of 20XX, and the second turn is April of 20XX. Then, the product invested at the first turn is a particular investment product in which the client's IM is invested in February of 20XX, and the product invested at the second turn is a particular investment product in which the client's IM is invested in April of 20XX. In this case, the unit purchase price of the product invested at the first turn means the unit price of the product invested at the first turn whose maturity date arrives in February of 20XX on the date of purchase, and the unit purchase price of the product invested at the second turn means the unit price of the product invested at the second turn whose maturity date arrives in April of 20XX on the date of purchase. (17) Unit purchase price of the product invested at the last turn: Unit price of the product invested at the last turn on the date of purchase. For example, if the investment period of the client's IM is one year, from January 1, 20XX until December 31, 20XX, and if the turns are set bimonthly, the last turn (i.e., the sixth turn) is December of 20XX. Then, the product invested at the last turn is a particular investment product in which the client's IM is invested at the sixth turn, i.e. in December of 20XX. In this case, the unit purchase price of the product invested at the last turn means the unit purchase price of the product invested at the sixth turn whose maturity date arrives in December of 20XX on the date of purchase. (18) Tax (automatically computed by the system): The amount of money imposed as tax which is determined depending on the identity of the client who operates the IM (e.g., whether it is a person or a corporate), the period during which the client who operates the IM owned the product invested at each turn and/or the product invested at the last turn, or the like. (19) Total expected cash input (set as the amount desired by the client or automatically computed by the system): The total amount of IM demanded on the client to meet the expected cash output at each turn and the expected cash output at the last turn.

With the recent rapid expansion of the economy, the number of clients (individuals, corporate clients, etc.) who invest their IM in various financial products such as stock, bond, deposit, installment savings, insurance, pension, etc. is increasing rapidly. Accordingly, the social significance of the IM managers (e.g., securities companies, banks, insurances companies, etc.) who mange the clients' IM is also increasing tremendously.

Recently, as the social/economical environments change rapidly and frequently, the needs of the clients on <making continuous profits above a certain level while safely operating their IM> are also increasing. And, the IM managers are making efforts in various ways in order to accommodate the clients' needs into their business pool.

However, since most of the existing financial products are, for example, either, safe but with two low profits or highly profitable but too risky, despite the various efforts of the IM managers, numerous clients cannot easily find the places to invest their IM that optimally match their needs (for example, the desire of being paid a bonus money not less than a predetermined amount at every turn of investment while guaranteeing the principal of the IM).

DISCLOSURE

Technical Problem

Thus, the present disclosure is directed to systemically arranging a computation module communicating with a client information processor and receiving client setup information input/set by a client (e.g., client's account information, investment type desired by the client, investment period of investment money (IM), grace period of IM, total expected cash input, expected cash output at each turn, expected cash output at the last turn, how to receive the expected cash output at each turn, how to receive the expected cash output at the last turn, etc.), a computation module selecting a product invested at each turn (of the IM investment period) and a product invested at the last turn (the last turn of the investment period) from among the investment products operated by an IM management server, according to the received client setup information, generating an IM operation simulation data reflecting the total expected cash input demanded on the client, the expected cash input at each/last turn for the product invested at each/last turn, the expected cash output at each turn resulting from the purchase/operation of the product invested at each turn, the expected cash output at the last turn resulting from the purchase/operation of the product invested at the last turn, the purchase quantity of the product invested at each turn to match the expected cash output at each turn, the purchase quantity of the product invested at the last turn to match the expected cash output at the last turn, etc. by simulating in advance the selected product invested at each/last turn according to the features of the products, and notifying the generated IM operation simulation data to the client information processor, a computation module, in response to a client approval data for the IM operation simulation data, transmitting the IM operation simulation data to the IM management server so as to allow the client to be paid the <expected cash output at each turn> not less than a predetermined amount at each turn of the IM investment period and to be paid the expected cash output at the last turn comparable to the principal of the IM at the last turn of the IM investment period, or the like, thereby effectively satisfying the needs of the client who invests and operates the IM (individual or corporate), for example, the desire of being paid a bonus money not less than a predetermined amount at every turn of investment while guaranteeing the principal of the IM, thus greatly improving the business competitiveness of the IM manager (e.g., securities company, bank, insurance company, etc.) as well as the client's investment satisfaction.

Technical Solution

In one general aspect, there is provided an investment money (IM) operating system including: an IM operation control module, while communicating with a client information processor connected to an online network, communicating with an IM management server that manages the investment of a client's IM in an investment product according to client setup information transmitted from the client information processor, and supporting the operation of IM; an IM operation simulation processing module, under the control of the IM operation control module, selecting a product invested at each turn and a product invested at the last turn from among the investment products operated by the IM management server, according to the client setup information, generating an IM operation simulation data reflecting the total expected cash input demanded on the client, the expected cash output at each turn resulting from the purchase/operation of the product invested at each turn, the expected cash output at the last turn resulting from the purchase/operation of the product invested at the last turn, the purchase quantity of the product invested at each turn to match the expected cash output at each turn, and the purchase quantity of the product invested at the last turn to match the expected cash output at the last turn, by simulating in advance the selected product invested at each/last turn according to the features of the products, and notifying the generated IM operation simulation data to the client information processor; and an IM operation execution module, under the control of the IM operation control module, transmitting the IM operation simulation data to the IM management server in response to client approval data for the IM operation simulation data so as to allow the product invested at each/last turn to be purchased and operated according to the purchase quantity of the product invested at each/last turn included in the IM operation simulation data and to allow the client to be paid the expected cash output at each turn and the expected cash output at the last turn at each turn and at the last turn, respectively.

In another general aspect, there is provided an IM operating system including: an IM operation control module, while communicating with a client information processor connected to an online network, communicating with an IM management server that manages the investment of a client's IM in an investment product according to client setup information transmitted from the client information processor, and supporting the operation of IM; an IM operation simulation processing module, under the control of the IM operation control module, selecting a product invested at the last turn from among the investment products operated by the IM management server, according to the client setup information, computing the total expected cash input demanded on the client, the expected cash input at the last turn required to purchase the product invested at the last turn, the expected cash output at the last turn resulting from the purchase/operation of the product invested at the last turn, and the purchase quantity of the product invested at the last turn to match the expected cash output at the last turn by simulating in advance the selected product invested at the last turn according to the features of the product invested at the last turn, computing the investment product purchase support money available for the purchase/operation of the investment product operated by the IM management server by subtracting the total expected cash input and the expected cash input at the last turn, generating an IM operation simulation data on the basis of the computed information, and notifying the generated IM operation simulation data to the client information processor; and an IM operation execution module, under the control of the IM operation control module, transmitting the IM operation simulation data to the IM management server in response to client approval data for the IM operation simulation data so as to allow the client to be paid the expected cash output at the last turn included in the IM operation simulation data at the last turn and to allow the client to be paid the investment product purchase support money included in the IM operation simulation data at the time included in the client setup information.

Advantageous Effects

In accordance with the present disclosure, since a computation module communicating with a client information processor and receiving client setup information input/set by a client (e.g., client's account information, investment type desired by the client, investment period of investment money (IM), grace period of IM, total expected cash input, expected cash output at each turn, expected cash output at the last turn, how to receive the expected cash output at each turn, how to receive the expected cash output at the last turn, etc.), a computation module selecting a product invested at each turn (of the IM investment period) and a product invested at the last turn (the last turn of the investment period) from among the investment products operated by an IM management server, according to the received client setup information, generating an IM operation simulation data reflecting the total expected cash input demanded on the client, the expected cash input at each/last turn for the product invested at each/last turn, the expected cash output at each turn resulting from the purchase/operation of the product invested at each turn, the expected cash output at the last turn resulting from the purchase/operation of the product invested at the last turn, the purchase quantity of the product invested at each turn to match the expected cash output at each turn, the purchase quantity of the product invested at the last turn to match the expected cash output at the last turn, etc. by simulating in advance the selected product invested at each/last turn according to the features of the products, and notifying the generated IM operation simulation data to the client information processor, a computation module, in response to a client approval data for the IM operation simulation data, transmitting the IM operation simulation data to the IM management server so as to allow the client to be paid the <expected cash output at each turn> not less than a predetermined amount at each turn of the IM investment period and to be paid the expected cash output at the last turn comparable to the principal of the IM at the last turn of the IM investment period, or the like, are arranged systemically, the needs of the client who invests and operates the IM (individual or corporate), for example, the desire of being paid a bonus money not less than a predetermined amount at every turn of investment while guaranteeing the principal of the IM are effectively satisfied. Consequently, the business competitiveness of the IM manager (e.g., securities company, bank, insurance company, etc.) and the client's investment satisfaction are greatly improved.

DESCRIPTION OF DRAWINGS

The above and other aspects, features and advantages of the disclosed exemplary embodiments will be more apparent from the following detailed description taken in conjunction with the accompanying drawings in which.

MODE FOR INVENTION

Exemplary embodiments now will be described more fully hereinafter with reference to the accompanying drawings, in which exemplary embodiments are shown.

Figure 1:
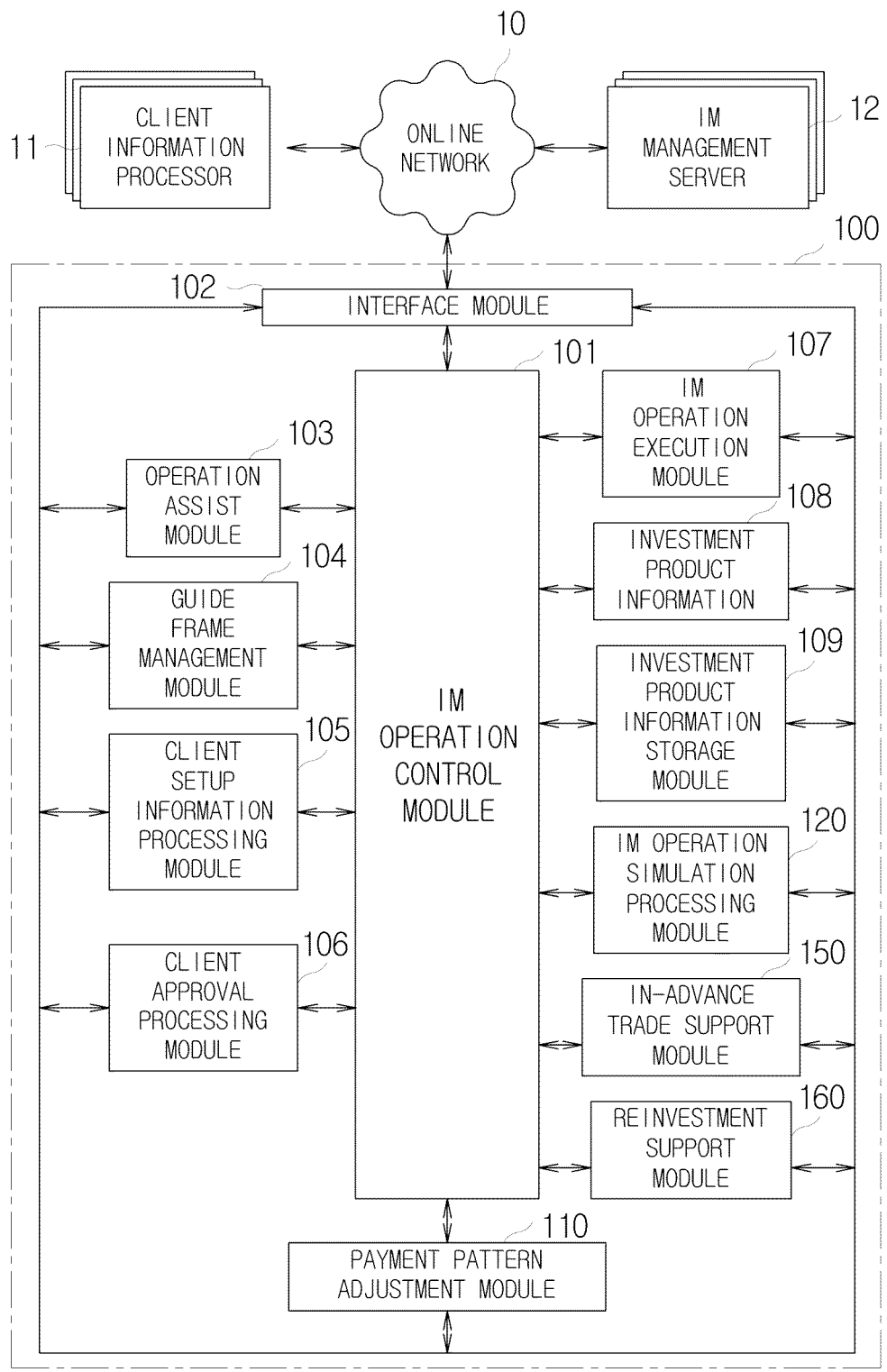
FIG. 1 schematically exemplifies an investment money (IM) operating system according to an embodiment of the present disclosure.

As illustrated in FIG. 1, an invest money (IM) operating system 100 according to the present disclosure includes an IM operation control module 101, while communicating with a client information processor 11 owned by a client and communicating with an IM management server 12 that manages the client's IM in an investment product via an online network 10, an interface module 102, or the like, supporting the operation of IM according to client setup information transmitted from the client information processor 11, and an operation assist module 103, a guide frame management module 104, a client setup information processing module 105, an investment product information management module 108, an investment product information storage module 109, an IM operation simulation processing module 120, a client approval processing module 106, and an IM operation execution module 107, which are controlled by the IM operation control module 101.

For example, the client information processor 11 may be various computing devices such as notebook personal computer (PC), desktop PC, etc., or various mobile devices such as cellular phone, Personal Communications Service (PCS) phone, synchronous/asynchronous International Mobile Telecommunication-2000 (IMT-2000) phone, palm PC, personal digital assistant (PDA), smartphone, Wireless Application Protocol (WAP) phone, game console (e.g., PlayStation), etc., depending on the client's situations.

The operation assist module 103 controlled by the IM operation control module 101 stably stores and manages various operation information required for the operation of IM, for example, registration information of the client, registration information of the IM management server, resources status information of the system 100, component information necessary for the computation processes by the computation modules of the system 100, text information/graphic information/setup information for generating a guide frame 300 (see FIG. 3), etc. in a storage (Of course, the above-listed operation information may be flexibly increased/decreased or changed in its kind or scope, depending on the situation of the system 100.).

Further, the operation assist module 103 manages various auxiliary procedures required for the operation of IM, for example, management of the client's log-in to the system, establishment/maintenance of communication sessions with the external computation devices 11, 12, update/management of the operation information, or the like.

Figure 2:
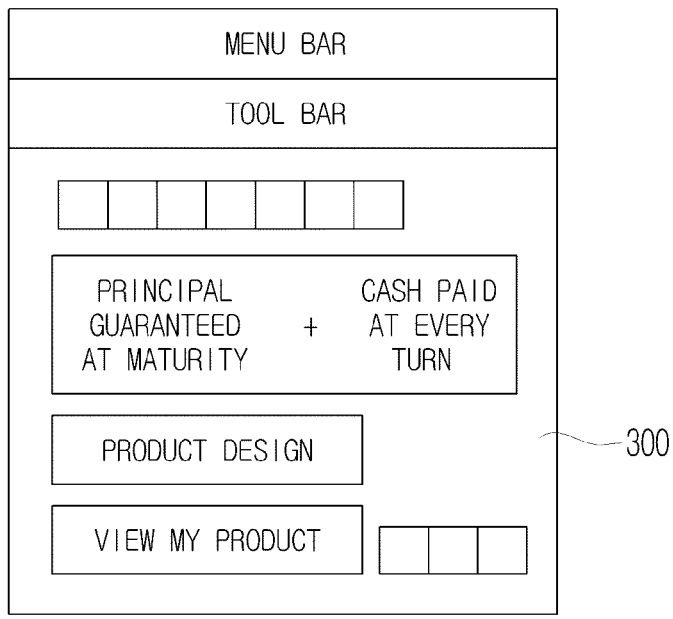
FIG. 2 schematically exemplifies a guide frame according to an embodiment of the present disclosure.

When the client logs in to the system 100 using the client information processor 11, the guide frame management module 104 controlled by the IM operation control module 101 extracts the text information, graphic information, setup information, etc. for generating the guide frame 300 by communicating with the operation assist module 103, generates the guide frame 300 using the extracted text information, graphic information, setup information, etc., and transmits the generated guide frame 300 to the client information processor 11, so that the guide frame 300 can be output/displayed on the client information processor 11, as illustrated in FIG. 2.

Figure 3:
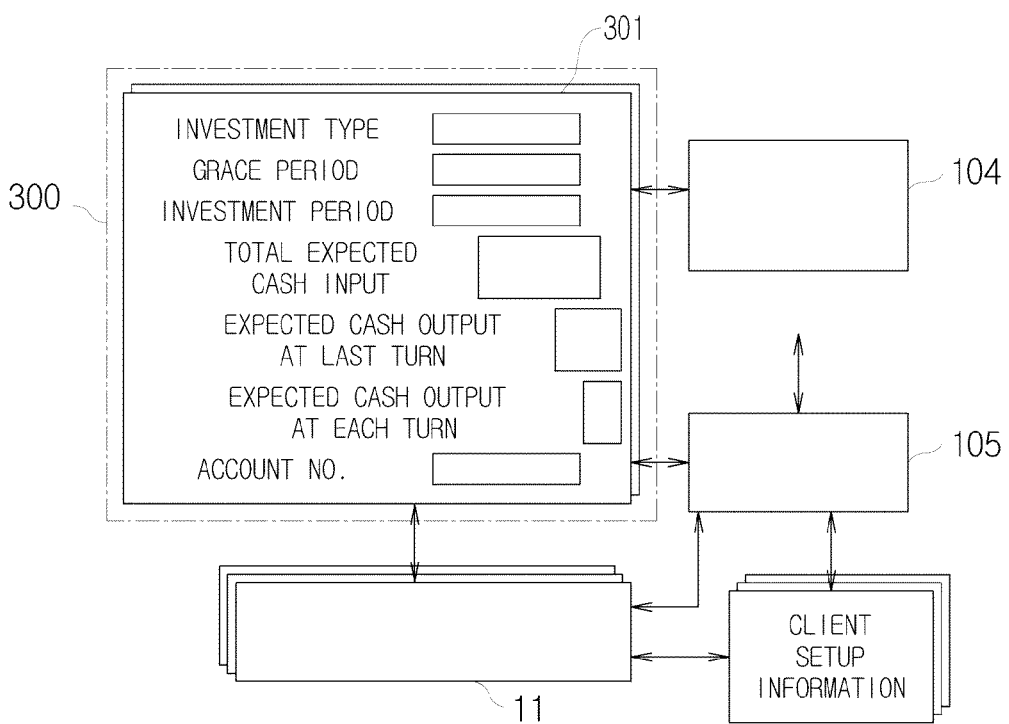
FIG. 3 schematically exemplifies an operation of a client setup information processing module according to an embodiment of the present disclosure.

In this situation, as illustrated in FIG. 3, when the client requests for operation of IM and information input support request information is transmitted from the client information processor 11, the client setup information processing module 105, under the control of the IM operation control module 101, generates <an information input guide frame 301 for allowing the client to input setup information related to the operation of IM> and transmits the generated information input guide frame 301 to the client information processor 11 via the interface module 102.

If the information input guide frame 301 is output/displayed on the client information processor 11, the client inputs/transmits information for each item of the information input guide frame 301. If the client setup information of the information input guide frame 301, for example, client's account information, investment type desired by the client, investment period of IM, grace period of IM, total expected cash input, expected cash output at each turn, expected cash output at the last turn, how to receive the expected cash output at each turn, how to receive the expected cash output at the last turn, etc., is transmitted from the client information processor 11, the client setup information processing module 105 receives the information via the interface module 102 and stores/manages the received information (see FIG. 3).

Figure 4:
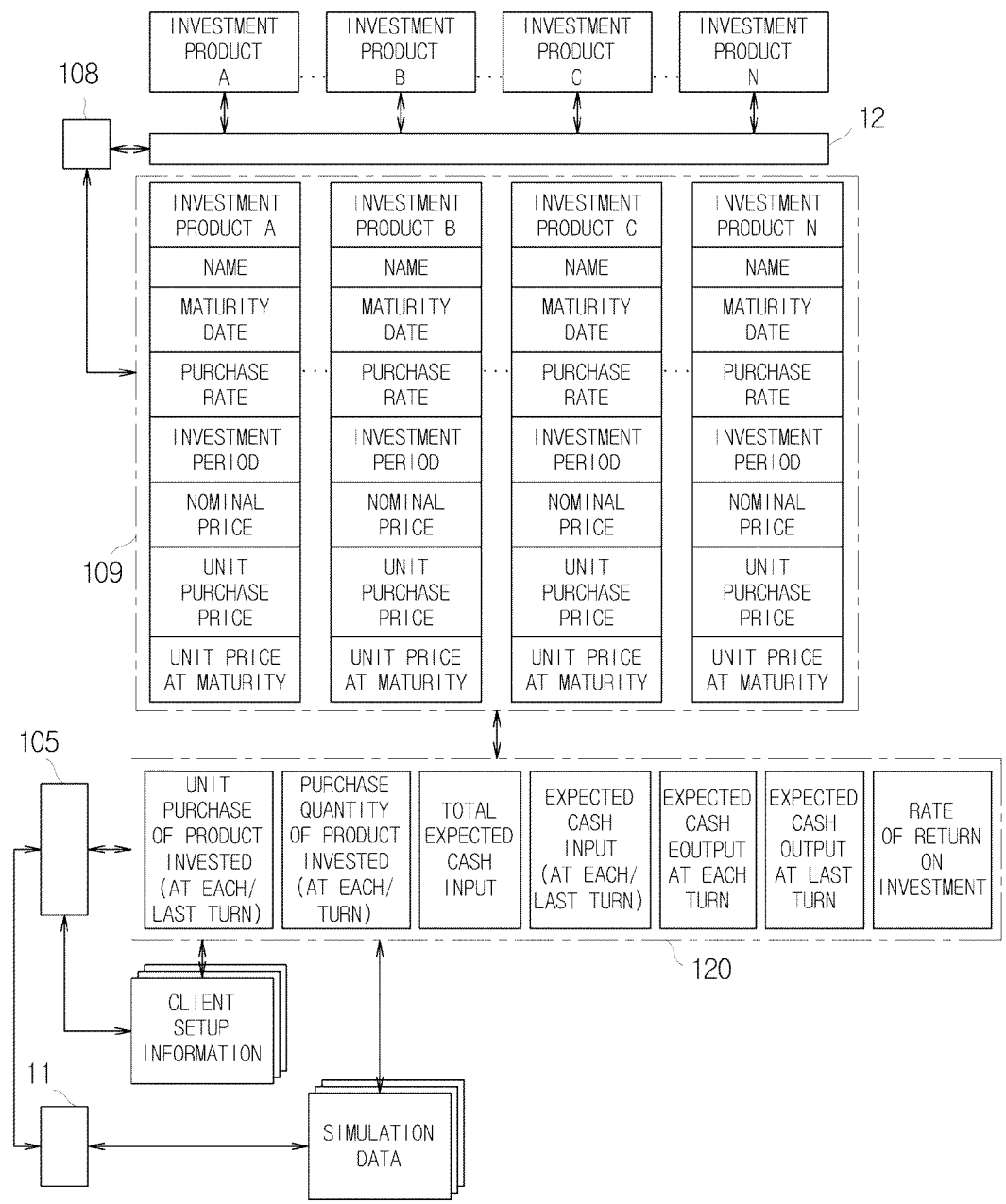
FIG. 4 schematically exemplifies an operation of an investment product information management module, an investment product information storage module, and an IM operation simulation processing module according to an embodiment of the present disclosure.

If the client setup information (e.g., client's account information, investment type desired by the client, investment period of IM, grace period of IM, total expected cash input, expected cash output at each turn, expected cash output at the last turn, how to receive the expected cash output at each turn, how to receive the expected cash output at the last turn, etc.) is received, as illustrated in FIG. 4, the investment product information management module 108 acquires information about the investment products operated by the IM management server 12 by communicating with the IM management server 12, and stably stores and manages the acquired investment product information in the investment product information storage module 109. The investment product information includes name, maturity date, purchase rate, investment period, nominal price, unit purchase price, unit price at maturity, etc. of each investment product (product A, product B, product C, product N, etc.).

Figure 5:
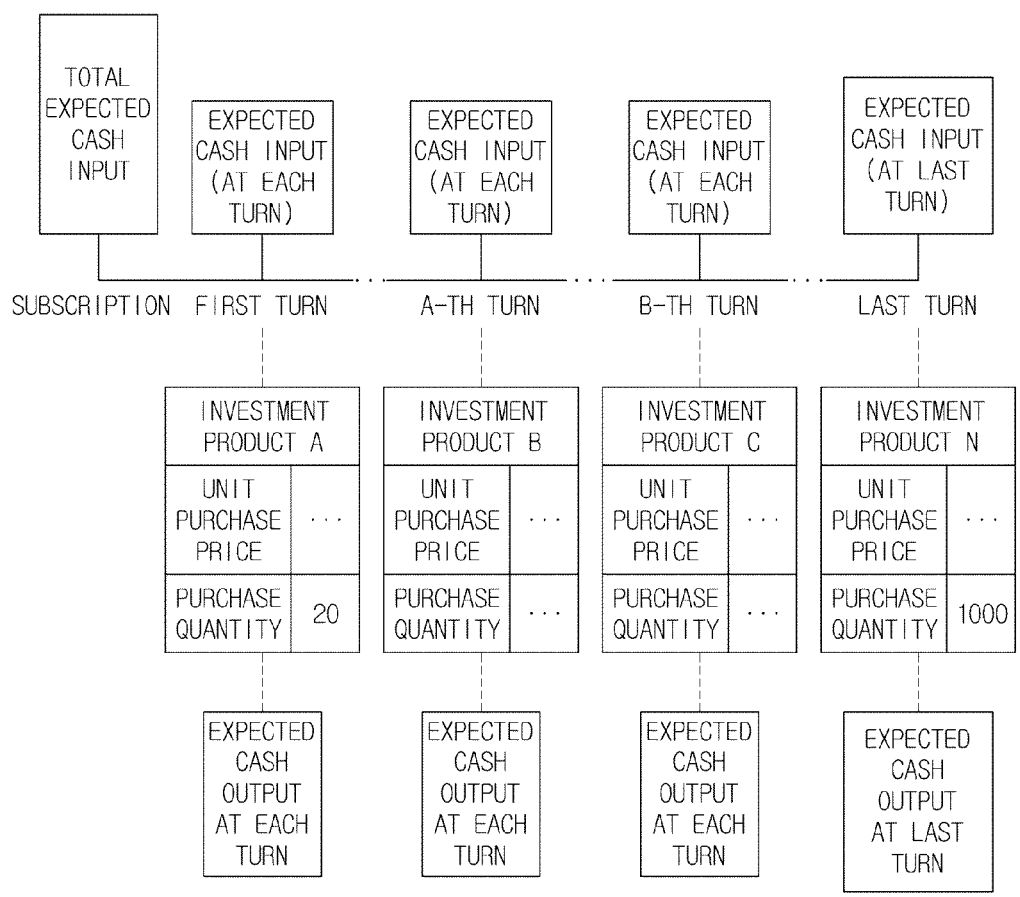
FIG. 5 schematically exemplifies a payment pattern of the expected cash output at each turn and the expected cash output at the last turn according to an embodiment of the present disclosure.

In a situation where the investment product information including the name, maturity date, purchase rate, investment period, nominal price, unit purchase price, unit price at maturity, etc. of each investment product (product A, product B, product C, product N, etc.) is stored and managed, as illustrated in FIG. 5, the IM operation simulation processing module 120 selects a product invested at each (e.g., 1st, a-th, b-th, etc.) turn (e.g., product A, product B, product C, etc.) and a product invested at the last turn (e.g., product N) from among the investment products (e.g., product A, product B, product C, product N, etc.) operated by the IM management server 12, according to the client setup information, generates an IM operation simulation data reflecting the total expected cash input demanded on the client, the expected cash input at each/last turn for the product invested at each/last turn (e.g., product A, product B, product C, product N, etc.), the expected cash output at each turn resulting from the purchase/operation of the product invested at each turn (e.g., product A, product B, product C, etc.), the expected cash output at each turn resulting from the purchase/operation of the product invested at the last turn (e.g., product N), the purchase quantity of the product invested at each turn to match the expected cash output at each turn, the purchase quantity of the product invested at the last turn to match the expected cash output at the last turn, etc. by simulating in advance the selected product invested at each/last turn according to the features of the products, and notifies the generated IM operation simulation data to the client information processor 11 (see FIGS. 4 and 5).

Figure 6:
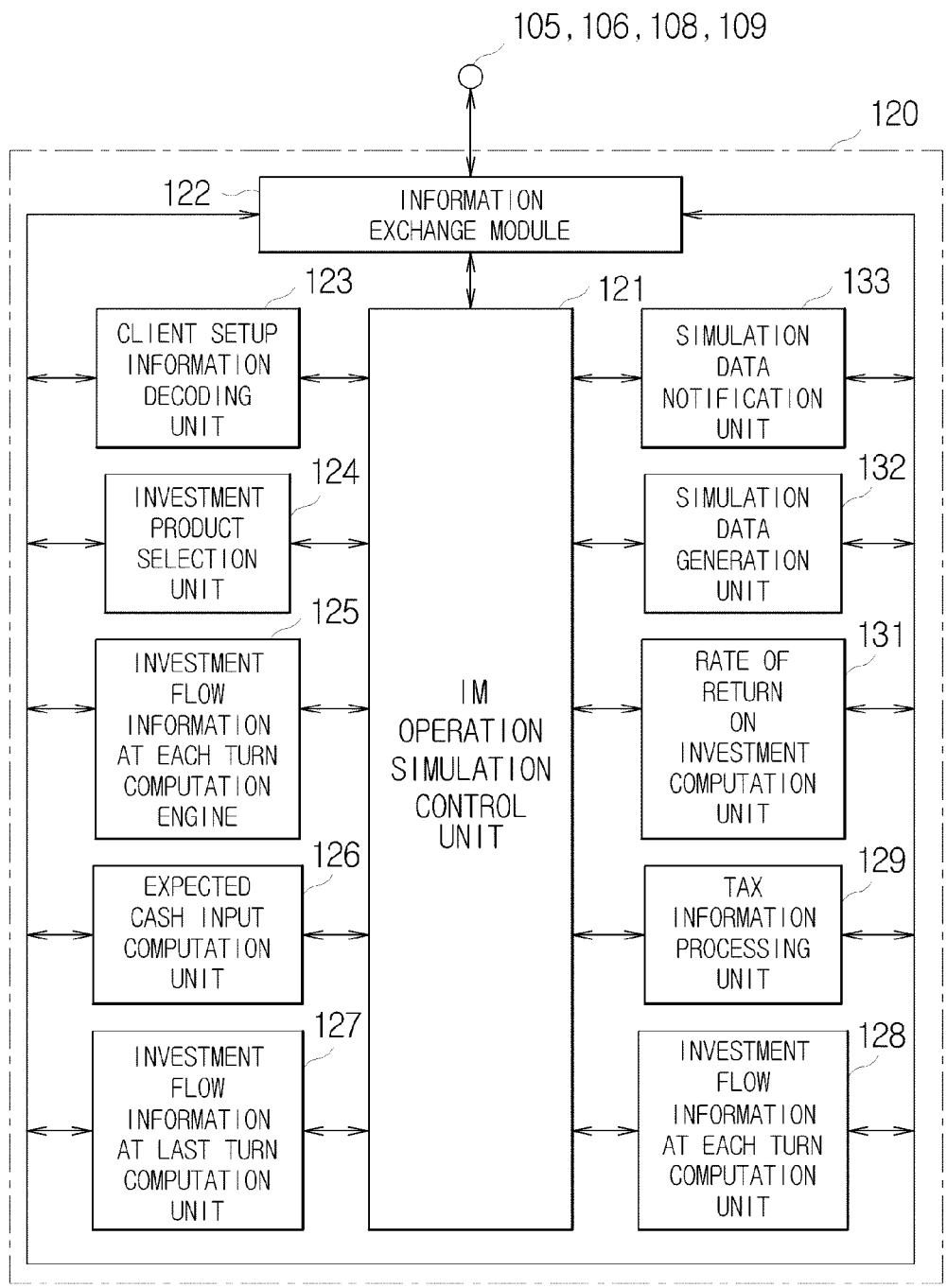
FIG. 6 schematically exemplifies a detailed configuration of an IM operation simulation processing module according to an embodiment of the present disclosure.

As illustrated in FIG. 6, the IM operation simulation processing module 120 includes an IM operation simulation control unit 121 controlling the overall IM operation simulation procedure, and a client setup information decoding unit 123, an investment product selection unit 124, an investment flow information at each turn computation engine 125, an expected cash input computation unit 126, an investment flow information at last turn computation unit 127, an investment flow information at each turn computation unit 128, a tax information processing unit 129, a rate of return on investment computation unit 131, a simulation data generation unit 132 and a simulation data notification unit 133, which are controlled by the IM operation simulation control unit 121.

The tax information processing unit 129 generates tax information for each client on the basis of the client setup information decoded by the client setup information decoding unit 123, and provides the generated tax information to the investment flow information at each turn computation engine 125, the expected cash input computation unit 126, the investment flow information at last turn computation unit 127 and the investment flow information at each turn computation unit 128.

Referring to the client setup information (e.g., client's account information, investment type desired by the client, investment period, grace period of IM, total expected cash input, expected cash output at each turn, expected cash output at the last turn, how to receive the expected cash output at each turn, how to receive the expected cash output at the last turn, etc.) decoded by the client setup information decoding unit 123, the investment product selection unit 124 communicates with the investment product information storage module 109, and selects the product invested at each (e.g., 1st, a-th, b-th, etc.) turn (e.g., product A, product B, product C, etc.) and the product invested at the last turn (e.g., product N) from among the investment products (e.g., product A, product B, product C, product N, etc.) operated by the IM management server 12.

As illustrated in FIG. 5, the product invested at each turn (e.g., product A, product B, product C, etc.) selected by the investment product selection unit 124 is an investment product whose maturity date arrives at each (e.g., 1st, a-th, b-th, etc.) turn of the investment period of IM selected by the client, and the product invested at the last turn (e.g., product N) selected by the investment product selection unit 124 is an investment product whose maturity date arrives at the last turn of the investment period of IM selected by the client.

For safe operation of IM, the product invested at each turn (e.g., product A, product B, product C, etc.) and the product invested at the last turn (e.g., product N) are selected from investment products of low risk such as government bond or municipal bond.

If the product invested at each (e.g., 1st, a-th, b-th, etc.) turn (e.g., product A, product B, product C, etc.) and the product invested at the last turn (e.g., product N) are selected, the IM operation simulation control unit 121 checks the client setup information by communicating with the client setup information decoding unit 123, and, according to the checking result, selectively activates one of the expected cash input computation unit 126, the investment flow information at last turn computation unit 127 and the investment flow information at each turn computation unit 128.

For example, if only the expected cash output at each turn and the expected cash output at the last turn desired by the client are included in the client setup information but the total expected cash input desired by the client is not included, the IM operation simulation control unit 121 selectively activates only the expected cash input computation unit 126 from among the expected cash input computation unit 126, the investment flow information at last turn computation unit 127 and the investment flow information at each turn computation unit 128, and computes the total expected cash input demanded on the client and other information (e.g., purchase quantity of the product invested at each turn, purchase quantity of the product invested at the last turn, etc.) (see FIG. 7).

And, if only the total expected cash input desired by the client and the expected cash output at each turn desired by the client are included in the client setup information but the expected cash output at the last turn is not included, the IM operation simulation control unit 121 selectively activates only the investment flow information at last turn computation unit 127 from among the expected cash input computation unit 126, the investment flow information at last turn computation unit 127 and the investment flow information at each turn computation unit 128, and computes the expected cash output at the last turn resulting from the purchase/operation of the product invested at the last turn and other information (e.g., purchase quantity of the product invested at each turn, purchase quantity of the product invested at the last turn, etc.) (see FIG. 8).

And, if only the total expected cash input desired by the client and the expected cash output at the last turn desired by the client are included in the client setup information but the expected cash output at each turn is not included, the IM operation simulation control unit 121 selectively activates only the investment flow information at each turn computation unit 128 from among the expected cash input computation unit 126, the investment flow information at last turn computation unit 127 and the investment flow information at each turn computation unit 128, and computes the expected cash output at each turn resulting from the purchase/operation of the product invested at each turn and other information (e.g., purchase quantity of the product invested at each turn, purchase quantity of the product invested at the last turn, etc.) (see FIG. 9).

First, the case where only the expected cash output at each turn and the expected cash output at the last turn desired by the client are included in the client setup information but the total expected cash input desired by the client is not included and only the expected cash input computation unit 126 is activated will be described.

Figure 7:
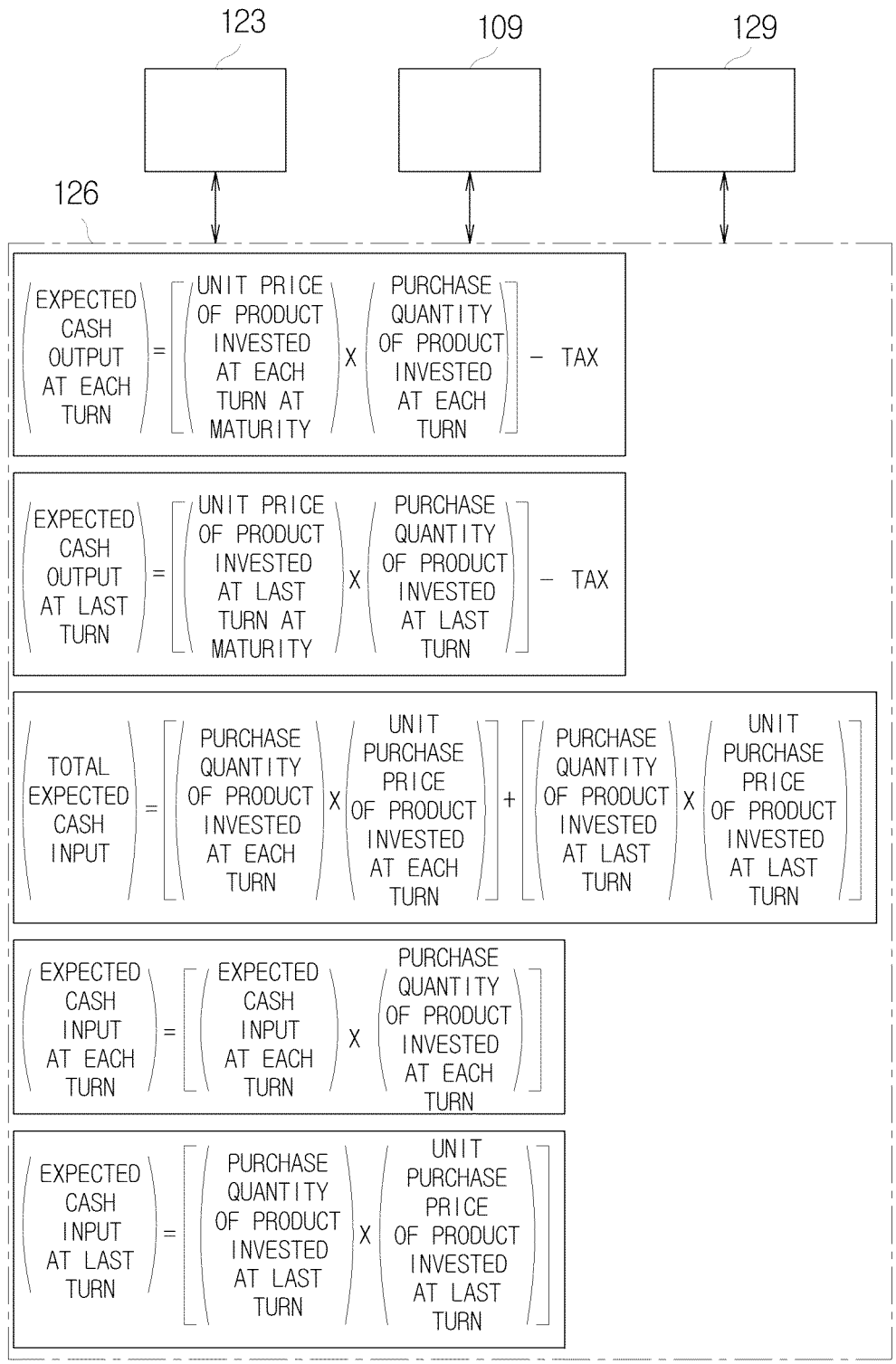
FIG. 7 schematically exemplifies an operation of an expected cash input computation unit according to an embodiment of the present disclosure.

In this case, as illustrated in FIG. 7, the activated expected cash input computation unit 126 acquires the expected cash output at the last turn and the expected cash output at each turn set by the client by decoding the client setup information, and acquires the unit price of the product invested at each turn at maturity, the unit price of the product invested at the last turn at maturity, the unit purchase price of the product invested at each turn, the unit purchase price of the product invested at the last turn, etc. by communicating with the investment product information storage module 109.

If the expected cash output at the last turn and the expected cash output at each turn set by the client and the unit price of the product invested at each turn at maturity, the unit price of the product invested at the last turn at maturity, the unit purchase price of the product invested at each turn, the unit purchase price of the product invested at the last turn, etc. stored in the investment product information storage module 109 are acquired, the expected cash input computation unit 126 computes the purchase quantity of the product invested at each turn (e.g., product A, product B, product C, etc.) from the equation {(expected cash output at each turn)=[(unit price of the product invested at each turn at maturity)×(purchase quantity of the product invested at each turn)]−tax}, computes the purchase quantity of the purchase quantity of the product invested at the last turn (e.g., product N) from the equation {(expected cash output at the last turn)=[(unit price of the product invested at the last turn at maturity)×(purchase quantity of the product invested at the last turn)]−tax}, and computes the expected cash input at each/last turn and the total expected cash input from the equations {(total expected cash input)=[(purchase quantity of the product invested at each turn)×(unit purchase price of the product invested at each turn)]+[(purchase quantity of the product invested at the last turn)×(unit purchase price of the product invested at the last turn)]}, {(expected cash input at each turn)=[(purchase quantity of the product invested at each turn)×(unit purchase price of the product invested at each turn)]} and {(expected cash input at the last turn)=[(purchase quantity of the product invested at the last turn)×(unit purchase price of the product invested at the last turn)]}.

Accordingly, the expected cash input computation unit 126 can acquire the purchase quantity of the product invested at each turn to match the expected cash output at each turn, the purchase quantity of the product invested at the last turn to match the expected cash output at the last turn, the expected cash input at each/last turn for the product invested at each/last turn, the total expected cash input demanded on the client, etc. without special difficulties.

Figure 11:
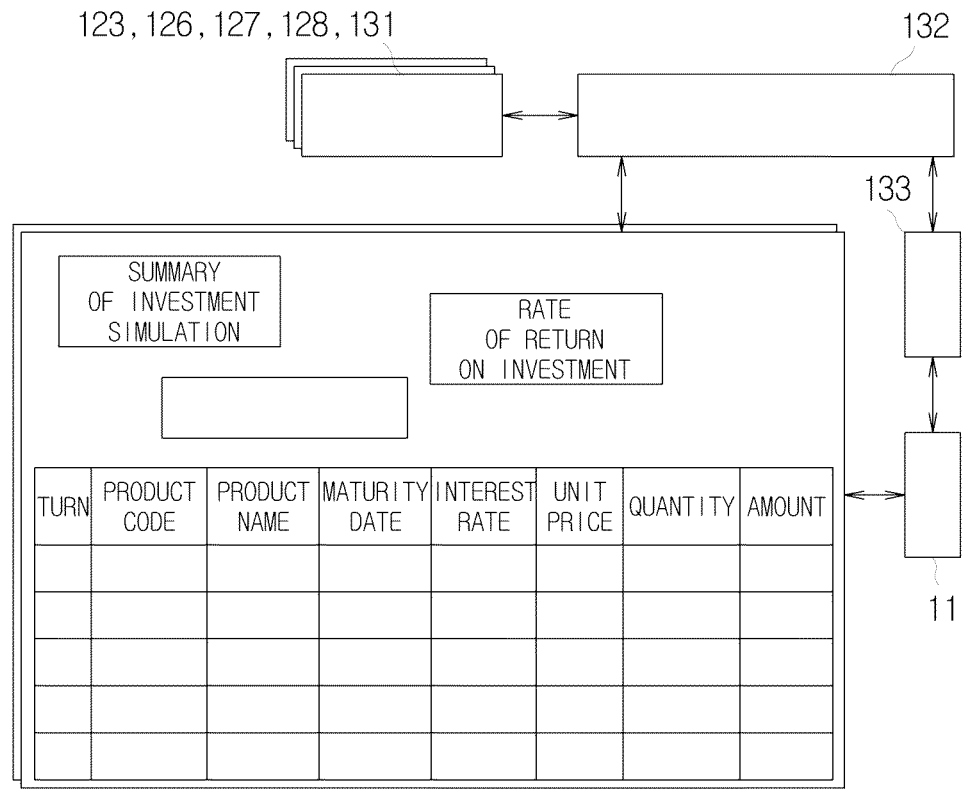
FIG. 11 schematically exemplifies an operation of a simulation data generation unit and a simulation data notification unit according to an embodiment of the present disclosure.

When such information is acquired, as illustrated in FIG. 5, the simulation data generation unit 132, under the control of the IM operation simulation control unit 121, generates an IM operation simulation data as illustrated in FIG. 11 by simulating in advance the purchase/operation of the product invested at each/last turn (e.g., product A, product B, product C, product N, etc.) on the basis of the features of the product invested at each/last turn, the expected cash output at the last turn and the expected cash output at each turn set by the client, the purchase quantity of the product invested at each turn, the purchase quantity of the product invested at the last turn, the expected cash input at each/last turn, and the total expected cash input computed by the expected cash input computation unit 126, etc. for each (e.g., 1st, a-th, b-th, etc.) turn and the last turn.

Figure 10:
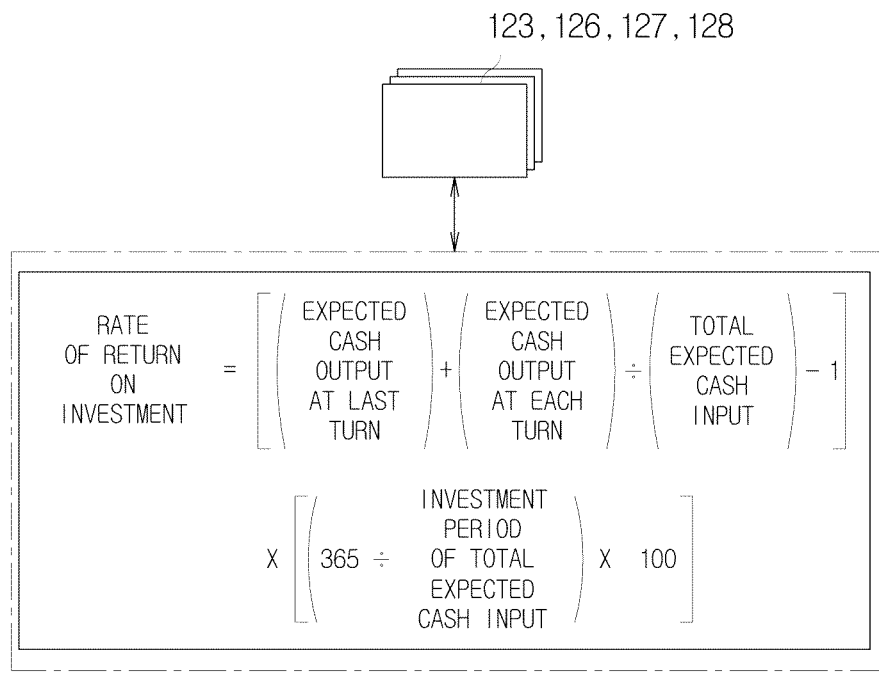
FIG. 10 schematically exemplifies an operation of a rate of return on investment computation unit according to an embodiment of the present disclosure.

As illustrated in FIG. 10, the rate of return on investment computation unit 131, under the control of the IM operation simulation control unit 121, computes the rate of return on investment corresponding to the total expected cash input from the equation {(rate of return on investment)=[(expected cash output at the last turn+expected cash output at each turn)+(total expected cash input)−1]×[(365+investment period of total expected cash input)×100]} using the values computed by the investment flow information at last turn computation unit 127 and set by the client, and transmits the computed rate of return on investment to the simulation data generation unit 132, so that the rate of return on investment corresponding to the total expected cash input is reflected in the IM operation simulation data.

If the IM operation simulation data is generated as such, the simulation data notification unit 133, under the control of the IM operation simulation control unit 121, communicates with the client information processor 11 via an information exchange module 122 or the interface module 102, and notifies the IM operation simulation data generated by the simulation data generation unit 132 to the client information processor 11, as illustrated in FIG. 11.

Figure 12:
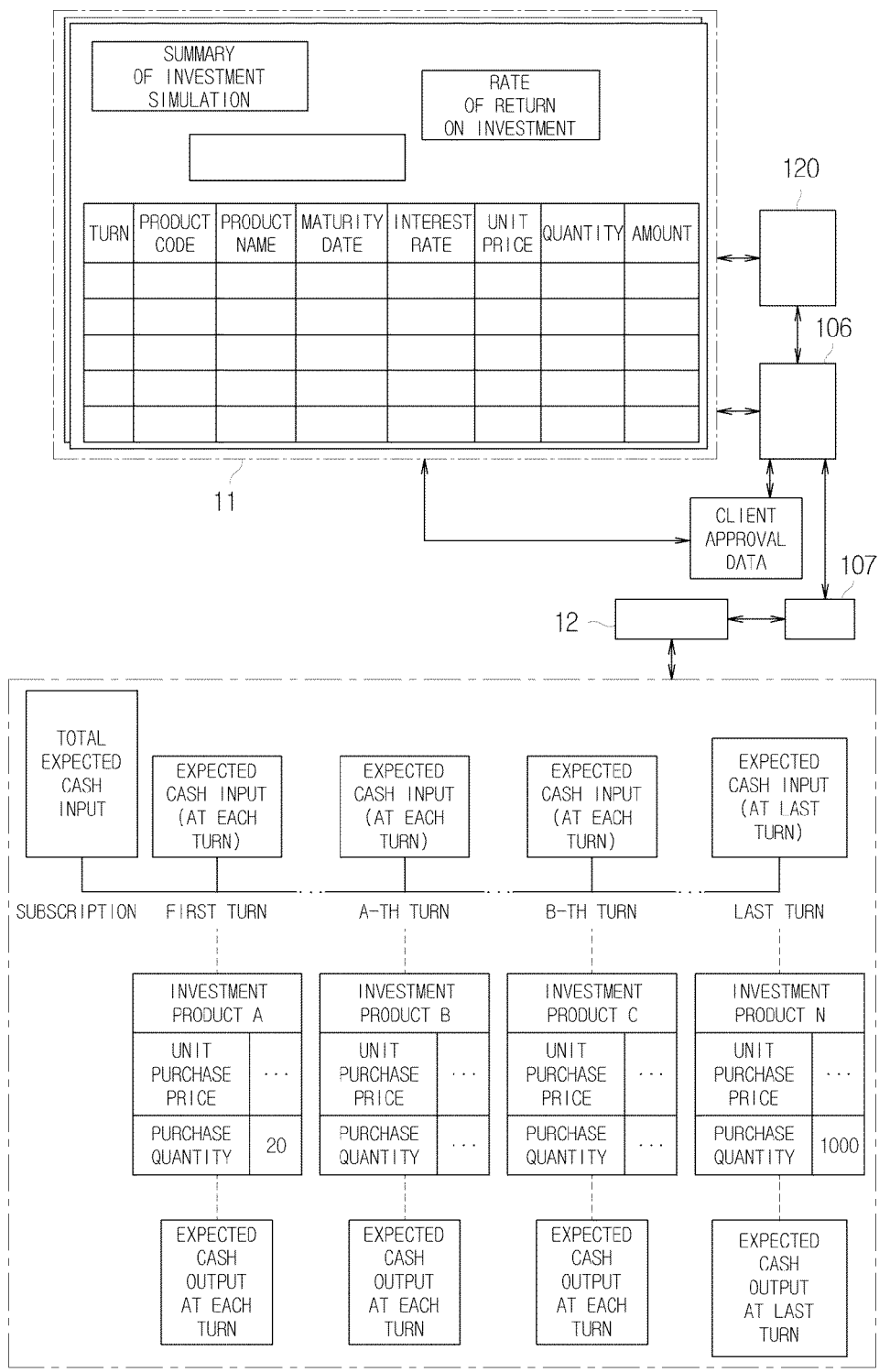
FIG. 12 schematically exemplifies an operation of a client approval processing module and an IM operation execution module according to an embodiment of the present disclosure.

Then, as illustrated in FIG. 12, the client may view the IM simulation data through the client information processor 11 in various forms such as table, document, graph, figure, etc., and adequately check the operation pattern of his/her IM.

If the client agrees to the simulation result and client approval data corresponding to the IM operation simulation data is transmitted from the client information processor 11, the client approval processing module 106 (see FIG. 1) receives it via the interface module 102, and transmits the received client approval data to the IM operation execution module 107 (see FIG. 12).

After receiving the client approval data, the IM operation execution module 107 transmits the IM operation simulation data to the IM management server 12.

Then, as illustrated in FIG. 12, the IM management server 12 may purchase/operate the product invested at each turn (e.g., product A, product B, product C, etc.) and the product invested at the last turn (e.g., product N) according to the expected cash input at each/last turn and the purchase quantity of the product invested at each/last turn included in the IM operation simulation data. As a result, the client may be paid the expected cash output at each turn and the expected cash output at the last turn at each (e.g., 1st, a-th, b-th, etc.) turn of the investment period of IM and at the last turn of the investment period of IM, respectively.

In this situation, the client who invests and operates the IM (individual or corporate) can satisfy his/her desire, for example, the desire of being paid a bonus money not less than a predetermined amount at every turn of investment while guaranteeing the principal of the IM. Thus, the business competitiveness of the IM manager (e.g., securities company, bank, insurance company, etc.) and the client's investment satisfaction are greatly improved.

Now, the case where only the total expected cash input desired by the client and the expected cash output at each turn desired by the client are included in the client setup information but the expected cash output at the last turn is not included and only the investment flow information at last turn computation unit 127 is activated will be described.

Figure 8:
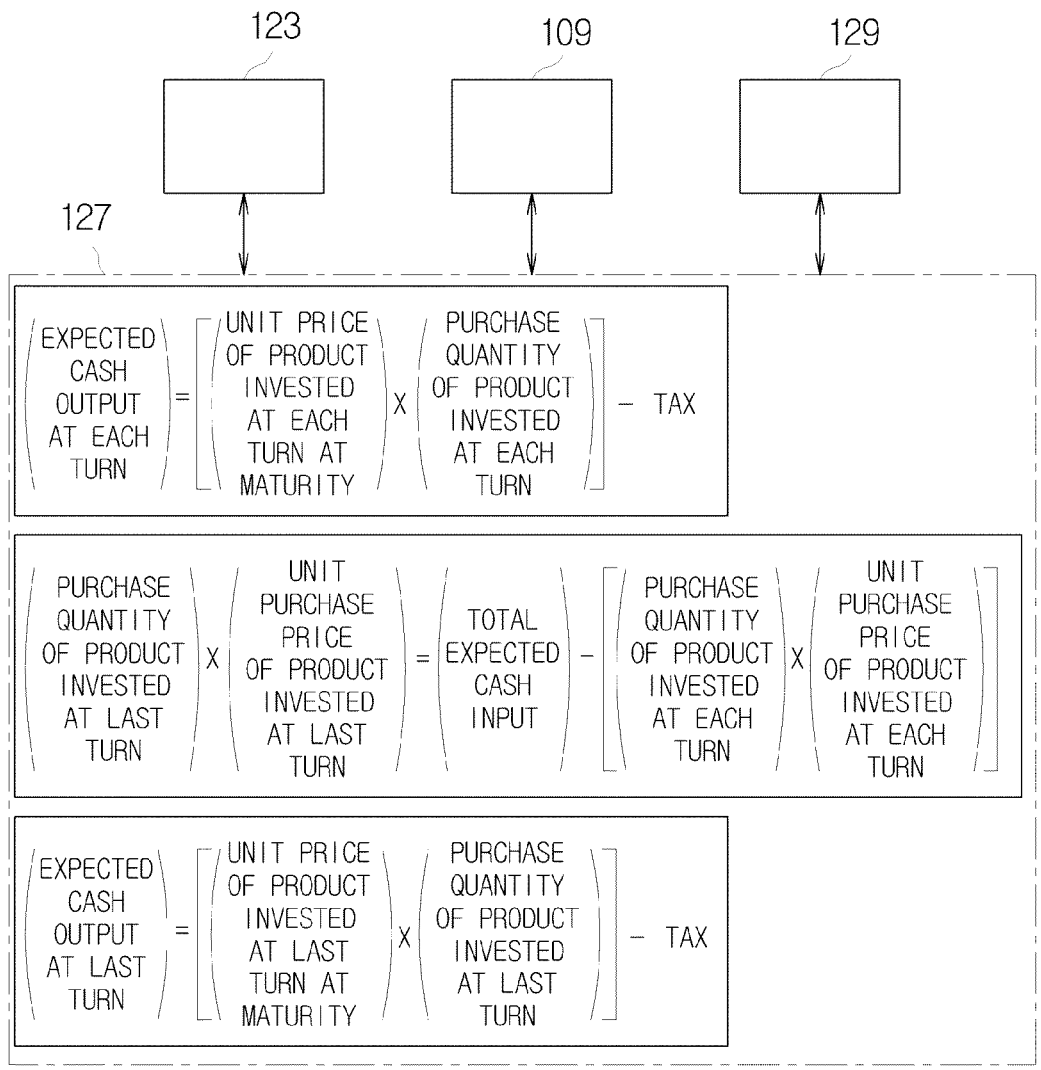
FIG. 8 schematically exemplifies an operation of an investment flow information at last turn computation unit according to an embodiment of the present disclosure.

In this case, as illustrated in FIG. 8, the activated investment flow information at last turn computation unit 127 acquires the total expected cash input desired by the client (set by the client) and the expected cash output at each turn desired by the client (set by the client) by decoding the client setup information, and acquires the unit price of the product invested at each turn at maturity, the unit price of the product invested at the last turn at maturity, the unit purchase price of the product invested at each turn, the unit purchase price of the product invested at the last turn, etc. by communicating with the investment product information storage module 109.

If the total expected cash input desired by the client (set by the client), the expected cash output at each turn desired by the client (set by the client), and the unit price of the product invested at each turn at maturity, the unit price of the product invested at the last turn at maturity, the unit purchase price of the product invested at each turn, the unit purchase price of the product invested at the last turn, etc. stored in the investment product information storage module 109 are acquired, the investment flow information at last turn computation unit 127 computes the purchase quantity of the product invested at each turn (e.g., product A, product B, product C, etc.) from the equation {(expected cash output at each turn)=[(unit price of the product invested at each turn at maturity)×(purchase quantity of the product invested at each turn)]−tax}, computes the purchase quantity of the product invested at the last turn (e.g., product N) from the equation {[(purchase quantity of the product invested at the last turn)×(unit purchase price of the product invested at the last turn)]=(total expected cash input)−[(purchase quantity of the product invested at each turn)×(unit purchase price of the product invested at each turn)]}>, and <computes the expected cash output at the last turn from the equation {(expected cash output at the last turn)=[(unit price of the product invested at the last turn at maturity)×(purchase quantity of the product invested at the last turn)]−tax}.

Accordingly, the investment flow information at last turn computation unit 127 can acquire the purchase quantity of the product invested at each turn to match the expected cash output at each turn, the purchase quantity of the product invested at the last turn to match the expected cash output at the last turn, the expected cash output at the last turn resulting from the purchase/operation of the product invested at the last turn, etc. without special difficulties.

When such information is acquired, as illustrated in FIG. 5, the simulation data generation unit 132, under the control of the IM operation simulation control unit 121, generates an IM operation simulation data as illustrated in FIG. 11 by simulating in advance the purchase/operation of the product invested at each/last turn (e.g., product A, product B, product C, product N, etc.) on the basis of <the features of the product invested at each/last turn, the total expected cash input and the expected cash output at each turn set by the client, the purchase quantity of the product invested at each turn, the purchase quantity of the product invested at the last turn, and the expected cash output at the last turn computed by the investment flow information at last turn computation unit 127, etc. for each (e.g., 1st, a-th, b-th, etc.) turn and the last turn.

Also in this case, as illustrated in FIG. 10, the rate of return on investment computation unit 131, under the control of the IM operation simulation control unit 121, computes the rate of return on investment corresponding to the total expected cash input from the equation {(rate of return on investment)= [(expected cash output at the last turn+expected cash output at each turn)+(total expected cash input)−1]×[(365÷investment period of total expected cash input)×100]} using the values computed by the investment flow information at last turn computation unit 127 and set by the client, and transmits the computed rate of return on investment to the simulation data generation unit 132, so that the rate of return on investment corresponding to the total expected cash input is reflected in the IM operation simulation data.

If the IM operation simulation data is generated as such, the simulation data notification unit 133, under the control of the IM operation simulation control unit 121, communicates with the client information processor 11 via the information exchange module 122 or the interface module 102, and notifies the IM operation simulation data generated by the simulation data generation unit 132 to the client information processor 11, as illustrated in FIG. 11.

Then, as illustrated in FIG. 12, the client may view the IM simulation data through the client information processor 11 in various forms such as table, document, graph, figure, etc., and adequately check the operation pattern of his/her IM.

If the client agrees to the simulation result and the client approval data corresponding to the IM operation simulation data is transmitted from the client information processor 11, the client approval processing module 106 (see FIG. 1) receives it via the interface module 102, and transmits the received client approval data to the IM operation execution module 107 (see FIG. 12).

After receiving the client approval data, the IM operation execution module 107 transmits the IM operation simulation data to the IM management server 12.

Then, as illustrated in FIG. 12, the IM management server 12 may purchase/operate the product invested at each turn (e.g., product A, product B, product C, etc.) and the product invested at the last turn (e.g., product N) according to the expected cash input at each/last turn and the purchase quantity of the product invested at each/last turn included in the IM operation simulation data. As a result, the client may be paid the expected cash output at each turn and the expected cash output at the last turn at <each (e.g., 1st, a-th, b-th, etc.) turn of the investment period of IM> and at the last turn of the investment period of IM, respectively.

In this situation, the client who invests and operates the IM (individual or corporate) can satisfy his/her desire, for example, the desire of being paid a bonus money not less than a predetermined amount at every turn of investment while guaranteeing the principal of the IM. Thus, the business competitiveness of the IM manager (e.g., securities company, bank, insurance company, etc.) and the client's investment satisfaction are greatly improved.

Now, the case where only the total expected cash input desired by the client and the expected cash output at the last turn desired by the client are included in the client setup information but the e expected cash output at each turn is not included and only the investment flow information at each turn computation unit 128 is activated will be described.

Figure 9:
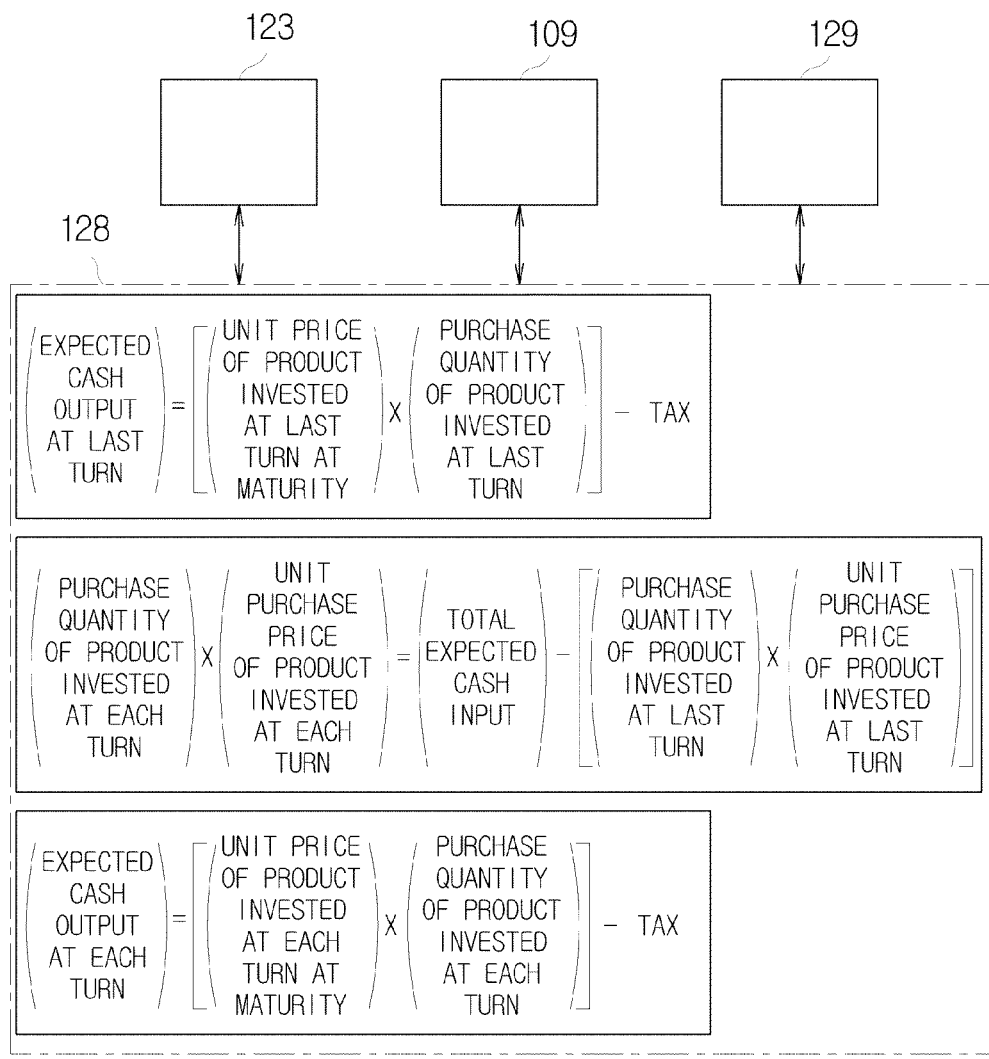
FIG. 9 schematically exemplifies an operation of an investment flow information at each turn computation unit according to an embodiment of the present disclosure.

In this case, as illustrated in FIG. 9, the activated investment flow information at each turn computation unit 128 acquires the total expected cash input desired by the client and the expected cash output at the last turn desired by the client by decoding the client setup information, and acquires the unit price of the product invested at each turn at maturity, the unit price of the product invested at the last turn at maturity, the unit purchase price of the product invested at each turn, the unit purchase price of the product invested at the last turn, etc. by communicating with the investment product information storage module 109.

If the total expected cash input desired by the client, the expected cash output at the last turn desired by the client, and the unit price of the product invested at each turn at maturity, the unit price of the product invested at the last turn at maturity, the unit purchase price of the product invested at each turn, the unit purchase price of the product invested at the last turn, etc. stored in the investment product information storage module 109 are acquired, the investment flow information at each turn computation unit 128 computes the purchase quantity of the product invested at the last turn from the equation {(expected cash output at the last turn)=[(unit price of the product invested at the last turn at maturity)×(purchase quantity of the product invested at the last turn)]−tax}, computes the purchase quantity of the product invested at each turn from the equation {[(purchase quantity of the product invested at each turn)×(unit purchase price of the product invested at each turn)]=(total expected cash input)−[(purchase quantity of the product invested at the last turn)×(unit purchase price of the product invested at the last turn)]}, and computes the expected cash output at each turn from the equation {(expected cash output at each turn)=[(unit price of the product invested at each turn at maturity)×(purchase quantity of the product invested at each turn)]−tax}.

Accordingly, the investment flow information at each turn computation unit 128 can acquire the the purchase quantity of the product invested at each turn to match the 20 expected cash output at each turn, the purchase quantity of the product invested at the last turn to match the expected cash output at the last turn, the expected cash output at each turn resulting from the purchase/operation of the product invested at each turn, etc. without special difficulties.

When such information is acquired, as illustrated in FIG. 5, the simulation data generation unit 132, under the control of the IM operation simulation control unit 121, generates an IM operation simulation data as illustrated in FIG. 11 by simulating in advance the purchase/operation of the product invested at each/last turn (e.g., product A, product B, product C, product N, etc.) on the basis of <the features of the product invested at each/last turn, the total expected cash input and the expected cash output at each turn set by the client, the purchase quantity of the product invested at each turn, the purchase quantity of the product invested at the last turn, and the expected cash output at the last turn computed by the investment flow information at each turn computation unit 128, etc. for each (e.g., 1st, a-th, b-th, etc.) turn and the last turn.

Also in this case, as illustrated in FIG. 10, the rate of return on investment computation unit 131, under the control of the IM operation simulation control unit 121, computes the rate of return on investment corresponding to the total expected cash input from the equation {(rate of return on investment)= [(expected cash output at the last turn+expected cash output at each turn)+(total expected cash input)−1]×[(365÷investment period of total expected cash input)×100]} using the values computed by the investment flow information at each turn computation unit 128 and set by the client, and transmits the computed rate of return on investment to the simulation data generation unit 132, so that the rate of return on investment corresponding to the total expected cash input is reflected in the IM operation simulation data.

If the IM operation simulation data is generated as such, the simulation data notification unit 133, under the control of the IM operation simulation control unit 121, communicates with the client information processor 11 via the information exchange module 122 or the interface module 102, and notifies the IM operation simulation data generated by the simulation data generation unit 132 to the client information processor 11, as illustrated in FIG. 11.

Then, as illustrated in FIG. 12, the client may view the IM simulation data through the client information processor 11 in various forms such as table, document, graph, figure, etc., and adequately check the operation pattern of his/her IM.

If the client agrees to the simulation result and the client approval data corresponding to the IM operation simulation data is transmitted from the client information processor 11, the client approval processing module 106 (see FIG. 1) receives it via the interface module 102, and transmits the received client approval data to the IM operation execution module 107 (see FIG. 12).

After receiving the client approval data, the IM operation execution module 107 transmits the IM operation simulation data to the IM management server 12.

Then, as illustrated in FIG. 12, the IM management server 12 may purchase/operate the product invested at each turn (e.g., product A, product B, product C, etc.) and the product invested at the last turn (e.g., product N) according to the expected cash input at each/last turn and the purchase quantity of the product invested at each/last turn included in the IM operation simulation data. As a result, the client may be paid the expected cash output at each turn and the expected cash output at the last turn at each (e.g., 1st, a-th, b-th, etc.) turn of the investment period of IM and at the last turn of the investment period of IM, respectively.

In this situation, the client who invests and operates the IM (individual or corporate) can satisfy his/her desire, for example, the desire of being paid a bonus money not less than a predetermined amount at every turn of investment while guaranteeing the principal of the IM. Thus, the business competitiveness of the IM manager (e.g., securities company, bank, insurance company, etc.) and the client's investment satisfaction are greatly improved.

In the situation where only the total expected cash input desired by the client and the expected cash output at the last turn desired by the client are included in the client setup information but the expected cash output at each turn is not included as above, as illustrated in FIGS. 13-17, the IM operation simulation control unit 121 may activate the investment flow information at each turn computation engine 125 instead of the investment flow information at each turn computation unit 128 to compute the expected cash output at each turn resulting from the purchase/operation of the product invested at each turn and other information (e.g., purchase quantity of the product invested at each turn, purchase quantity of the product invested at the last turn, etc.) (In this case, the investment flow information at each turn computation unit 128 may be omitted.).

Figure 13:
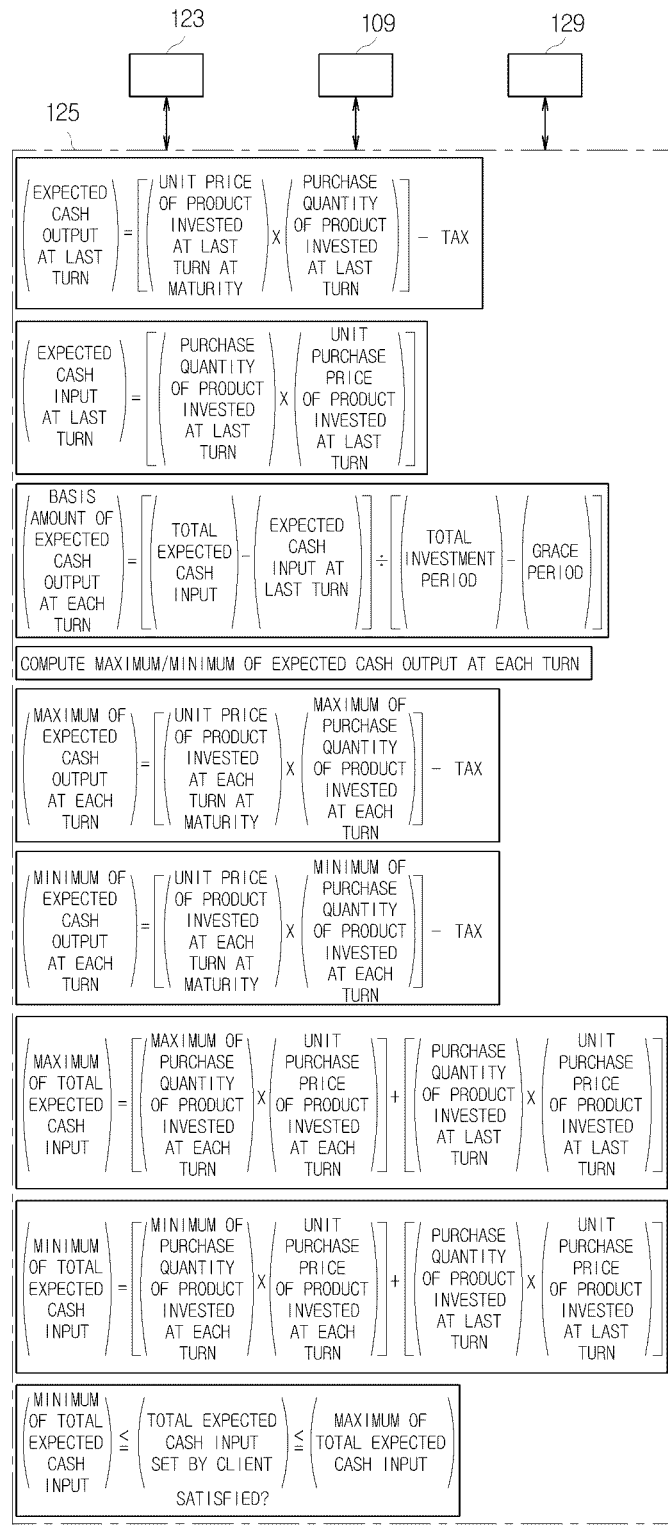
FIG. 13 schematically exemplifies an operation of an investment flow information at each turn computation engine according to an embodiment of the present disclosure.

In this case, as illustrated in FIG. 13, the activated investment flow information at each turn computation engine 125 acquires the total expected cash input desired by the client and the expected cash output at the last turn desired by the client by decoding the client setup information, and acquires the unit price of the product invested at each turn at maturity, the unit price of the product invested at the last turn at maturity, the unit purchase price of the product invested at each turn, the unit purchase price of the product invested at the last turn, etc. by communicating with the investment product information storage module 109.

If the total expected cash input desired by the client, the expected cash output at the last turn desired by the client, and the unit price of the product invested at each turn at maturity, the unit price of the product invested at the last turn at maturity, the unit purchase price of the product invested at each turn, the unit purchase price of the product invested at the last turn, etc. stored in the investment product information storage module 109 are acquired, the investment flow information at each turn computation engine 125 computes the purchase quantity of the product invested at the last turn from the equation {(expected cash output at the last turn)−[(unit price of the product invested at the last turn at maturity)×(purchase quantity of the product invested at the last turn)]−tax}, computes the expected cash input at the last turn from the equation {(expected cash input at the last turn)=(purchase quantity of the product invested at the last turn)×(unit purchase price of the product invested at the last turn)}, and computes the basis amount of the expected cash output at each turn from the equation {(basis amount of the expected cash output at each turn)=[(total expected cash input)−(expected cash input at the last turn)]÷[(investment period)−(grace period)]}.

Accordingly, the investment flow information at each turn computation engine 125 can acquire the purchase quantity of the product invested at the last turn to match the expected cash output at the last turn, the basis amount of the expected cash output at each turn for computing the expected cash output at each turn resulting from the purchase/operation of the product invested at each turn, etc. without special difficulties.

When the purchase quantity of the product invested at the last turn to match the expected cash output at the last turn, the basis amount of the expected cash output at each turn for computing the expected cash output at each turn resulting from the purchase/operation of the product invested at each turn, etc. are acquired, the investment flow information at each turn computation engine 125 computes the maximum/minimum of the expected cash output at each turn by increasing/decreasing the computed basis amount of the expected cash output at each turn by, for example, ±30% (see FIG. 13).

If the computed basis amount of the expected cash output at each turn is 1 million won, the minimum of the expected cash output at each turn is computed as 0.7 million won, and the maximum of the expected cash output at each turn is computed as 1.3 million won.

If the maximum/minimum of the expected cash output at each turn are computed, the investment flow information at each turn computation engine 125 computes the maximum of the purchase quantity of the product invested at each turn from the equation {(maximum of the expected cash output at each turn)=[(unit price of the product invested at each turn at maturity)×(maximum of the purchase quantity of the product invested at each turn)]−tax}, computes the minimum of the purchase quantity of the product invested at each turn from the equation {(minimum of the expected cash output at each turn)=[(unit price of the product invested at each turn at maturity)×(minimum of the purchase quantity of the product invested at each turn)]−tax}, computes the maximum of the total expected cash input from the equation {(maximum of the total expected cash input)=[(maximum of the purchase quantity of the product invested at each turn)×(unit purchase price of the product invested at each turn)]+[(purchase quantity of the product invested at the last turn)×(unit purchase price of the product invested at the last turn)]}, and computes the minimum of the total expected cash input from the equation {(minimum of the total expected cash input)=[(minimum of the purchase quantity of the product invested at each turn)×(unit purchase price of the product invested at each turn)]+[(purchase quantity of the product invested at the last turn)×(unit purchase price of the product invested at the last turn)]} (see FIG. 13).

If the maximum of the total expected cash input and the minimum of the total expected cash input are computed, the investment flow information at each turn computation engine 125 determines whether the computed maximum/minimum of the total expected cash input satisfy the relationship {(minimum of the total expected cash input)≦(total expected cash input set by the client)≦(maximum of the total expected cash input)} (see FIG. 13).

Figure 14:
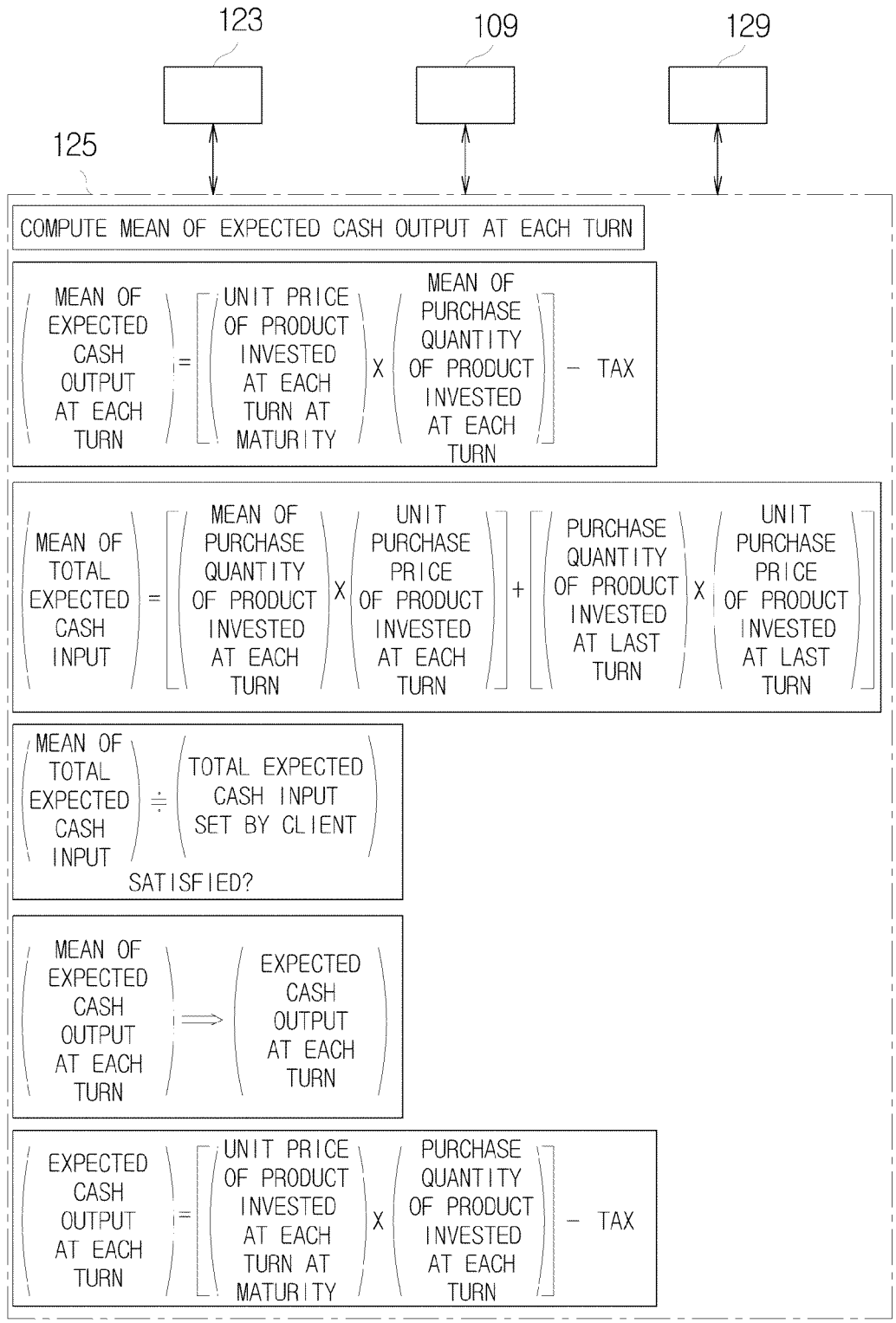
FIG. 14 schematically exemplifies an operation of an investment flow information at each turn computation engine according to another embodiment of the present disclosure.

For example, if the computed maximum of the total expected cash input is 110 million won, the computed minimum of the total expected cash input is 90 million won, and the total expected cash input set by the client is 100 million won, such that the maximum/minimum of the total expected cash input satisfy the relationship {(minimum of the total expected cash input)≦(total expected cash input set by the client)≦(maximum of the total expected cash input)}, the investment flow information at each turn computation engine 125 computes the mean of the expected cash output at each turn which is the mean of the maximum/minimum of the expected cash output at each turn, as illustrated in FIG. 14.

If the computed maximum of the expected cash output at each turn is 1 million won, and the computed minimum of the expected cash output at each turn is 0.7 million won, the mean of the expected cash output at each turn is computed as 0.85 million won.

If the mean of the expected cash output at each turn is computed, the investment flow information at each turn computation engine 125 computes the mean of the purchase quantity of the product invested at each turn from the equation {(mean of the expected cash output at each turn)=[(unit price of the product invested at each turn at maturity)×(mean of the purchase quantity of the product invested at each turn)]−tax}, and computes the mean of the total expected cash input from the equation {(mean of the total expected cash input)=[(mean of the purchase quantity of the product invested at each turn)×(unit purchase price of the product invested at each turn)]+[(purchase quantity of the product invested at the last turn)×(unit purchase price of the product invested at the last turn)]} (see FIG. 14).

If the mean of the total expected cash input is computed, the investment flow information at each turn computation engine 125 determines whether the computed mean of the total expected cash input satisfies the relationship {(mean of the total expected cash input)≈(total expected cash input set by the client)}. If it is determined that the computed mean of the total expected cash input satisfies the relationship {(mean of the total expected cash input)≈(total expected cash input set by the client)}, the mean of the expected cash output at each turn (e.g., 0.85 million won) is decided as the expected cash output at each turn resulting from the purchase/operation of the product invested at each turn (see FIG. 14).

If the expected cash output at each turn is decided, the investment flow information at each turn computation engine 125 computes the purchase quantity of the product invested at each turn to match the expected cash output at each turn from the equation {(expected cash output at each turn)=[(unit price of the product invested at each turn at maturity)×(purchase quantity of the product invested at each turn)]−tax}.

Accordingly, the investment flow information at each turn computation engine 125 can acquire the purchase quantity of the product invested at each turn to match the expected cash output at each turn, the purchase quantity of the product invested at the last turn to match the expected cash output at the last turn, the expected cash output at each turn resulting from the purchase/operation of the product invested at each turn, etc. without special difficulties.

When such information is acquired, as illustrated in FIG. 5, the simulation data generation unit 132, under the control of the IM operation simulation control unit 121, generates an IM operation simulation data as illustrated in FIG. 11 by simulating advance the purchase/operation of the product invested at each/last turn (e.g., product A, product B, product C, product N, etc.) on the basis of the features of the product invested at each/last turn, the total expected cash input and the expected cash output at each turn set by the client, the purchase quantity of the product invested at each turn, the purchase quantity of the product invested at the last turn, and the expected cash output at the last turn computed by the investment flow information at each turn computation unit 128, etc. for each (e.g., 1st, a-th, b-th, etc.) turn and the last turn.

Also in this case, as illustrated in FIG. 10, the rate of return on investment computation unit 131, under the control of the IM operation simulation control unit 121, computes the rate of return on investment corresponding to the total expected cash input from the equation {(rate of return on investment)=[(expected cash output at the last turn+expected cash output at each turn)+(total expected cash input)−1]×[(365÷investment period of total expected cash input)×100]} using the values computed by the investment flow information at each turn computation unit 128 and set by the client, and transmits the computed rate of return on investment to the simulation data generation unit 132, so that the rate of return on investment corresponding to the total expected cash input is reflected in the IM operation simulation data.

If the IM operation simulation data is generated as such, the simulation data notification unit 133, under the control of the IM operation simulation control unit 121, communicates with the client information processor 11 via the information exchange module 122 or the interface module 102, and notifies the IM operation simulation data generated by the simulation data generation unit 132 to the client information processor 11, as illustrated in FIG. 11.

Then, as illustrated in FIG. 12, the client may view the IM simulation data through the client information processor 11 in various forms such as table, document, graph, figure, etc., and adequately check the operation pattern of his/her IM.

If the client agrees to the simulation result and the client approval data corresponding to the IM operation simulation data is transmitted from the client information processor 11, the client approval processing module 106 (see FIG. 1) receives it via the interface module 102, and transmits the received client approval data to the IM operation execution module 107 (see FIG. 12).

After receiving the client approval data, the IM operation execution module 107 transmits the IM operation simulation data to the IM management server 12.

Then, as illustrated in FIG. 12, the IM management server 12 may purchase/operate the product invested at each turn (e.g., product A, product B, product C, etc.) and the product invested at the last turn (e.g., product N) according to the expected cash input at each/last turn and the purchase quantity of the product invested at each/last turn included in the IM operation simulation data. As a result, the client may be paid the expected cash output at each turn and the expected cash output at the last turn at each (e.g., 1st, a-th, b-th, etc.) turn of the investment period of IM> and at the last turn of the investment period of IM, respectively.

In this situation, the client who invests and operates the IM (individual or corporate) can satisfy his/her desire, for example, the desire of being paid a bonus money not less than a predetermined amount at every turn of investment while guaranteeing the principal of the IM. Thus, the business competitiveness of the IM manager (e.g., securities company, bank, insurance company, etc.) and the client's investment satisfaction are greatly improved.

Figure 15:
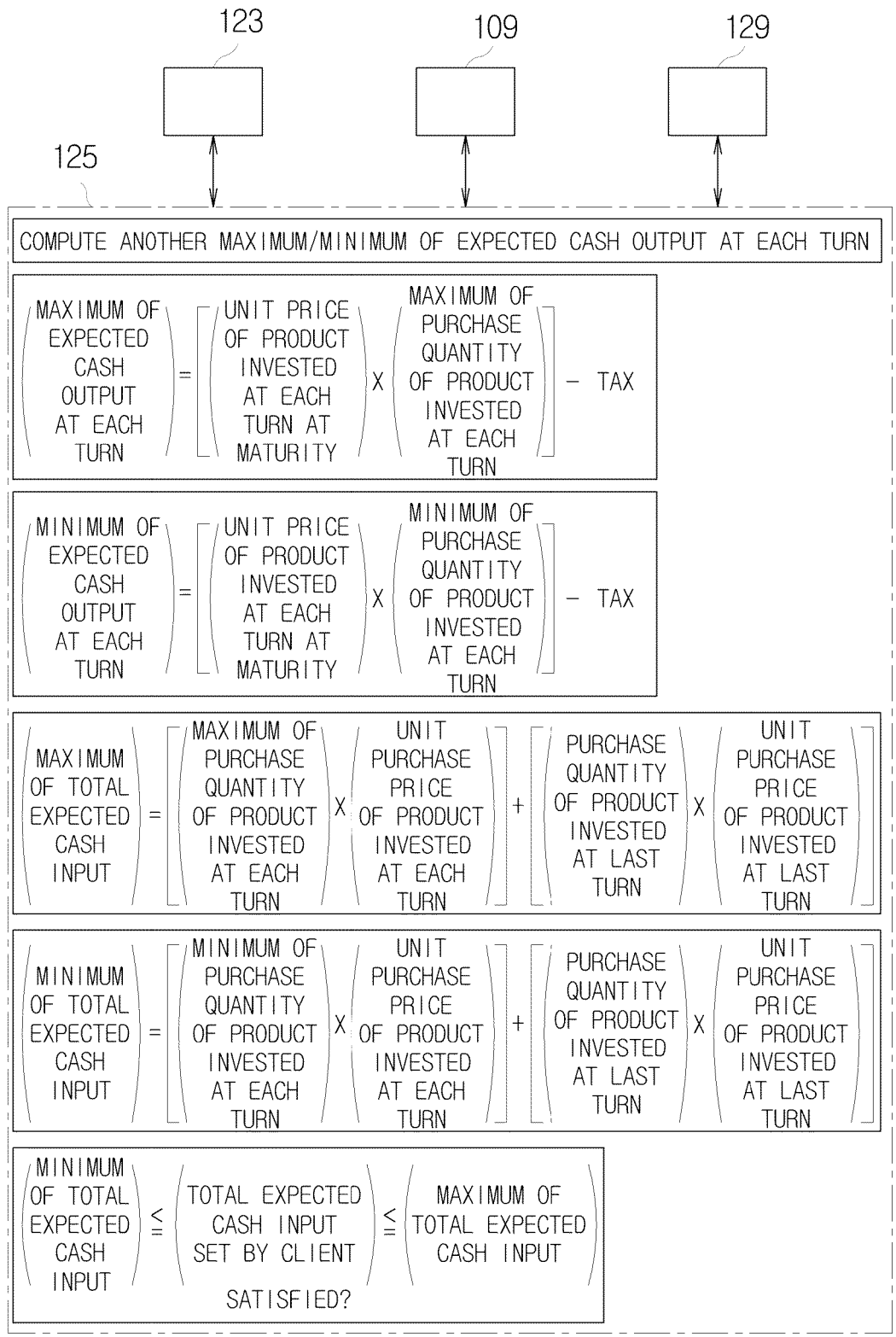
FIG. 15 schematically exemplifies an operation of an investment flow information at each turn computation engine according to another embodiment of the present disclosure.

As a result of the determination whether the maximum/minimum of the total expected cash input satisfy the relationship {(minimum of the total expected cash input)≦(total expected cash input set by the client)≦(maximum of the total expected cash input)} by the investment flow information at each turn computation engine 125, as illustrated in FIG. 13, for example, if the computed maximum of the total expected cash input is 110 million won, the computed minimum of the total expected cash input is 90 million won, and the total expected cash input set by the client is 85 million won, and thus it is determined that the computed maximum/minimum of the total expected cash input do not satisfy the relationship {(minimum of the total expected cash input)≦(total expected cash input set by the client)≦(maximum of the total expected cash input)}, the investment flow information at each turn computation engine 125 computes another maximum/minimum of the expected cash output at each turn by increasing/decreasing the computed basis amount of the expected cash output at each turn by ±40%, as illustrated in FIG. 15.

In this case, if the computed basis amount of the expected cash output at each turn is 1 million won, the another minimum of the expected cash output at each turn is computed as 0.6 million won, and the another maximum of the expected cash output at each turn is computed as 1.4 million won.

If the another maximum/minimum of the expected cash output at each turn are computed, the investment flow information at each turn computation engine 125 computes the maximum of the purchase quantity of the product invested at each turn from the equation {(maximum of the expected cash output at each turn)=[(unit price of the product invested at each turn at maturity)×(maximum of the purchase quantity of the product invested at each turn)]−tax}, computes the minimum of the purchase quantity of the product invested at each turn from the equation {(minimum of the expected cash output at each turn)=[(unit price of the product invested at each turn at maturity)×(minimum of the purchase quantity of the product invested at each turn)]−tax}, computes another maximum of the total expected cash input from the equation {(maximum of the total expected cash input)=[(maximum of the purchase quantity of the product invested at each turn)×(unit purchase price of the product invested at each turn)]+[(purchase quantity of the product invested at the last turn)×(unit purchase price of the product invested at the last turn)]}, and computes another minimum of the total expected cash input from the equation {(minimum of the total expected cash input)=[(minimum of the purchase quantity of the product invested at each turn)×(unit purchase price of the product invested at each turn)]+[(purchase quantity of the product invested at the last turn)×(unit purchase price of the product invested at the last turn)]} (see FIG. 15).

If another maximum of the total expected cash input and another minimum of the total expected cash input are computed, the investment flow information at each turn of computation engine 125 determines again whether the computed another maximum/minimum of the total expected cash input satisfy the relationship {(minimum of the total expected cash input)≦(total expected cash input set by the client)≦(maximum of the total expected cash input)}. As such, the situation where the maximum/minimum of the total expected cash input computed first in FIG. 13 do not satisfy the relationship {(minimum of the total expected cash input)≦(total expected cash input set by the client)≦(maximum of the total expected cash input)} may be adequately avoided (see FIG. 15).

Figure 16:
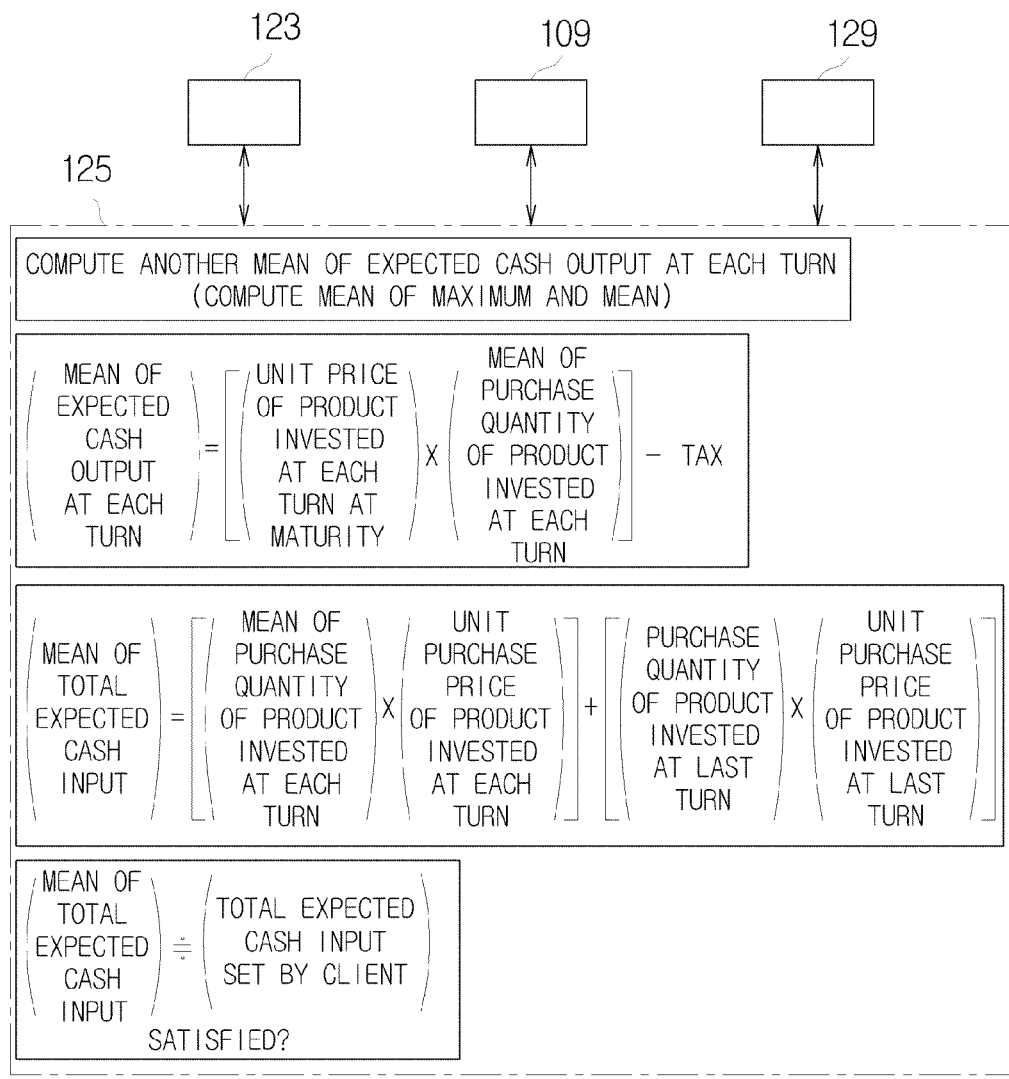
FIG. 16 schematically exemplifies an operation of an investment flow information at each turn computation engine according to another embodiment of the present disclosure.

As a result of the determination whether the mean of the total expected cash input satisfies the relationship {(mean of the total expected cash input)≈(total expected cash input set by the client)} by the investment flow information at each turn computation engine 125, as illustrated in FIG. 14, if it is determined that the mean of the total expected cash input does not satisfy the relationship, the investment flow information at each turn computation engine 125 computes another mean of the expected cash output at each turn which is the mean of the maximum of the expected cash output at each turn and the mean of the expected cash output at each turn, as illustrated in FIG. 16.

For example, if the computed maximum of the expected cash output at each turn is 1 million won, and the computed minimum of the expected cash output at each turn is 0.7 million won, the another mean of the expected cash output at each turn is computed as 0.925 million won, which is the mean value of their mean 0.85 million won and the maximum 1 million won.

If the another mean of the expected cash output at each turn is computed, the investment flow information at each turn computation engine 125 computes the mean of the purchase quantity of the product invested at each turn from the equation {(mean of the expected cash output at each turn)=[(unit price of the product invested at each turn at maturity)×(mean of the purchase quantity of the product invested at each turn)]−tax}, and computes another mean of the total expected cash input from the equation {(mean of the total expected cash input)=[(mean of the purchase quantity of the product invested at each turn)×(unit purchase price of the product invested at each turn)]+[(purchase quantity of the product invested at the last turn)×(unit purchase price of the product invested at the last turn)]} (see FIG. 16).

If the another mean of the total expected cash input is computed, the investment flow information at each turn computation engine 125 determines again whether the computed another mean of the total expected cash input satisfies the relationship {(mean of the total expected cash input)≈(total expected cash input set by the client)]. As such, the situation where <the mean of the total expected cash input computed first in FIG. 14 does not satisfy the relationship {(mean of the total expected cash input)≈(total expected cash input set by the client)} may be adequately avoided (see FIG. 16).

Figure 17:
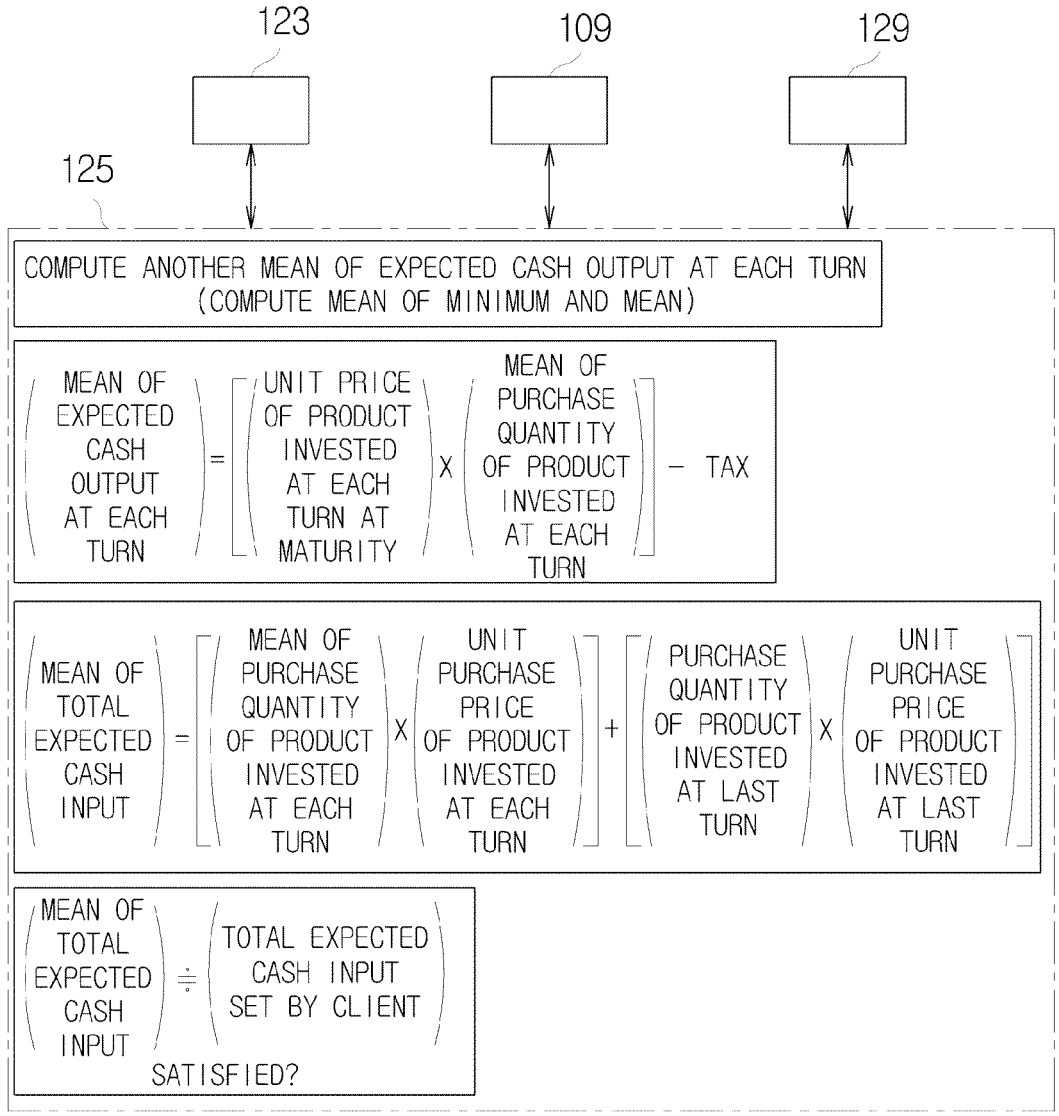
FIG. 17 schematically exemplifies an operation of an investment flow information at each turn computation engine according to another embodiment of the present disclosure.

Alternatively, when it is determined that the mean of the total expected cash input does not satisfy the relationship {(mean of the total expected cash input)≈(total expected cash input set by the client)}, the investment flow information at each turn computation engine 125 may further compute another mean of the expected cash output at each turn which is the mean value of the minimum of the expected cash output at each turn and the mean of the expected cash output at each turn, as illustrated in FIG. 17.

For example, if the computed maximum of the expected cash output at each turn is 1 million won, and the compute minimum of the expected cash output at each turn is 0.7 million won, the another mean of the expected cash output at each turn is computed as 0.775 million won, which is the mean value of their mean 0.85 million won and the minimum 0.7 million won.

If the another mean of the expected cash output at each turn is computed, the investment flow information at each turn computation engine 125 computes the mean of the purchase quantity of the product invested at each turn from the equation {(mean of the expected cash output at each turn)=[(unit price of the product invested at each turn at maturity)×(mean of the purchase quantity of the product invested at each turn)]−tax}, and computes another mean of the total expected cash input from the equation {(mean of the total expected cash input)= [(mean of the purchase quantity of the product invested at each turn)×(unit purchase price of the product invested at each turn)]+[(purchase quantity of the product invested at the last turn)×(unit purchase price of the product invested at the last turn)]} (see FIG. 17).

If the another mean of the total expected cash input is computed, the investment flow information at each turn computation engine 125 determines again whether the computed another mean of the total expected cash input satisfies the relationship {(mean of the total expected cash input)≈(total expected cash input set by the client)}. As such, the situation where the mean of the total expected cash input computed first in FIG. 14 does not satisfy the relationship {(mean of the total expected cash input)≈(total expected cash input set by the client)} may be adequately avoided (see FIG. 17).

Figure 18:
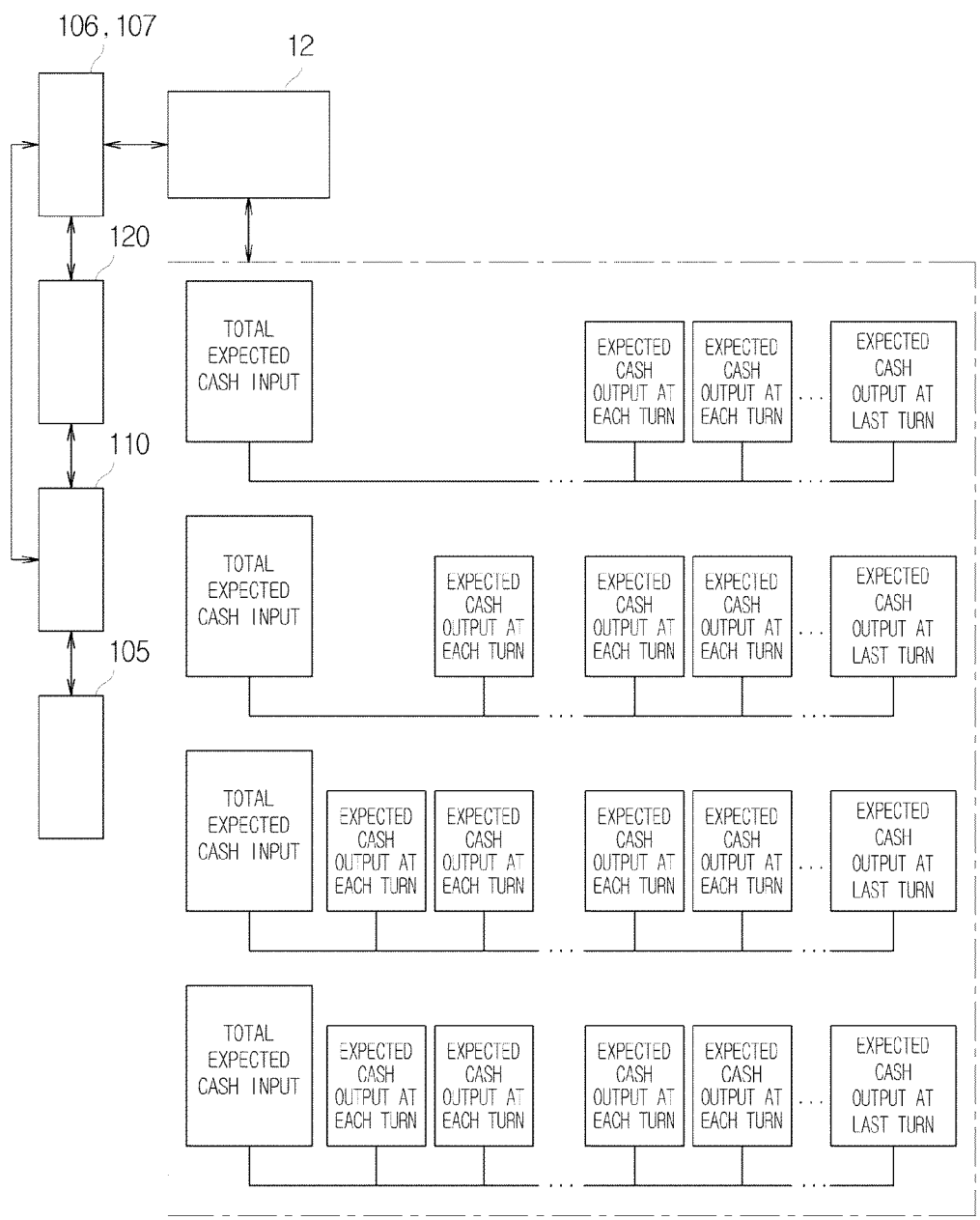
FIG. 18 schematically exemplifies an operation of a payment pattern adjustment module according to an embodiment of the present disclosure.

As illustrated in FIG. 18, a payment pattern adjustment module 110 may be further provided in addition to the above-described computation modules.

The payment pattern adjustment module 110 communicates with the client setup information processing module 105 and, according to the client setup information managed thereby, corrects/adjusts the amount or time of payment of the expected cash output at the last turn or the expected cash output at each turn included in the IM operation simulation data according to the client setup information, so as to provide various payment patterns of the expected cash output at each turn or the expected cash output at the last turn paid to the client corresponding to the client setup information.

When the IM operation simulation data is partly corrected by the payment pattern adjustment module, the correction result is transmitted to the IM management server. The payment pattern of the expected cash output at the last turn and the payment pattern of the expected cash output at each turn may be a pattern by which an equal amount of the expected cash output at each turn is paid at each turn and a pattern by which the expected cash output at the last turn corresponding to the principal of the IM is paid on the maturity date> as illustrated in FIG. 5. Alternatively, there may be various other patterns, for example, a pattern by which the expected cash output at each turn is not paid for a predetermined grace period and a more amount of expected cash output at each turn is paid at each turn after the grace period elapses, a payment pattern by which the amount of expected cash output at each turn increases turn by turn, but the amount of expected cash output at the last turn decreases, a payment pattern by which a smaller amount of expected cash output at each turn is paid each turn early, but a larger amount of expected cash output at each turn is paid each turn toward the last turn, a payment pattern by which a larger amount of expected cash output at each turn is paid each turn early, but a smaller amount of expected cash output at each turn is paid each turn toward the last turn or a payment pattern by which the amount of expected cash output at each turn paid each turn gradually increases with time, to name a few (see FIG. 18). In this situation, the client can more flexibly operate his/her IM simply by changing his/her setup information.

Also, as illustrated in FIG. 1, an in-advance trade support module 150 and a reinvestment support module 160 may be further provided in addition to the above-described computation modules.

Figure 19:
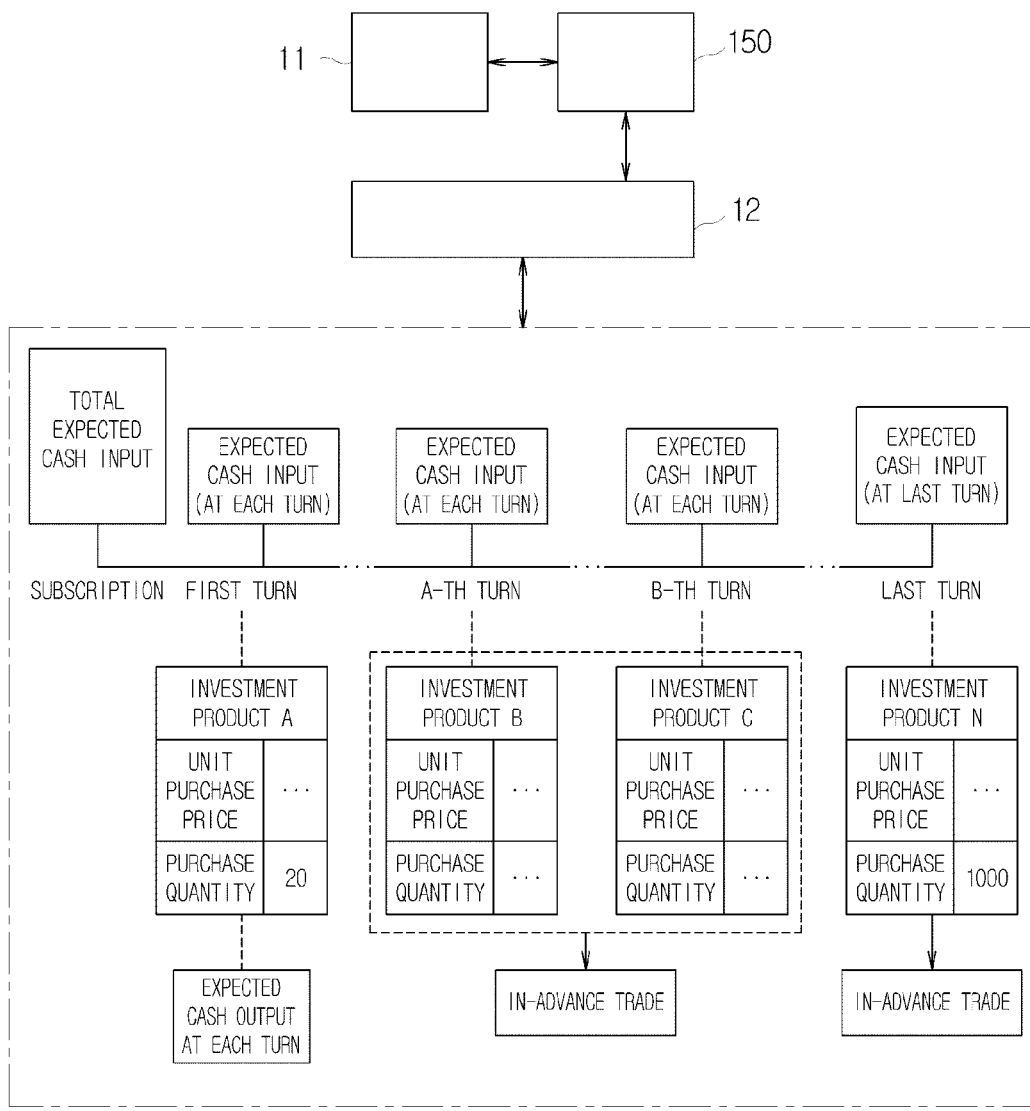
FIG. 19 schematically exemplifies an operation of an in-advance trade support module according to an embodiment of the present disclosure.

The in-advance trade support module 150 communicates with the client information processor 11 and, in the situation where the product invested at each/last turn is purchased/ operated according to the purchase quantity of the product invested at each/last turn included in the IM operation simulation data and the expected cash output at each turn and the expected cash output at the last turn have been or are to be paid to the client, under the control of the IM operation control module, communicates with the IM management server 12 according to the client setup information transmitted from the client information processor 11 and supports such that all or part of the product invested at each/last turn may be traded in advance before the each turn or the last turn arrives, as illustrated in FIG. 19.

Accordingly, the client can easily receive a considerable amount of money when he/she needs it.

Figure 20:
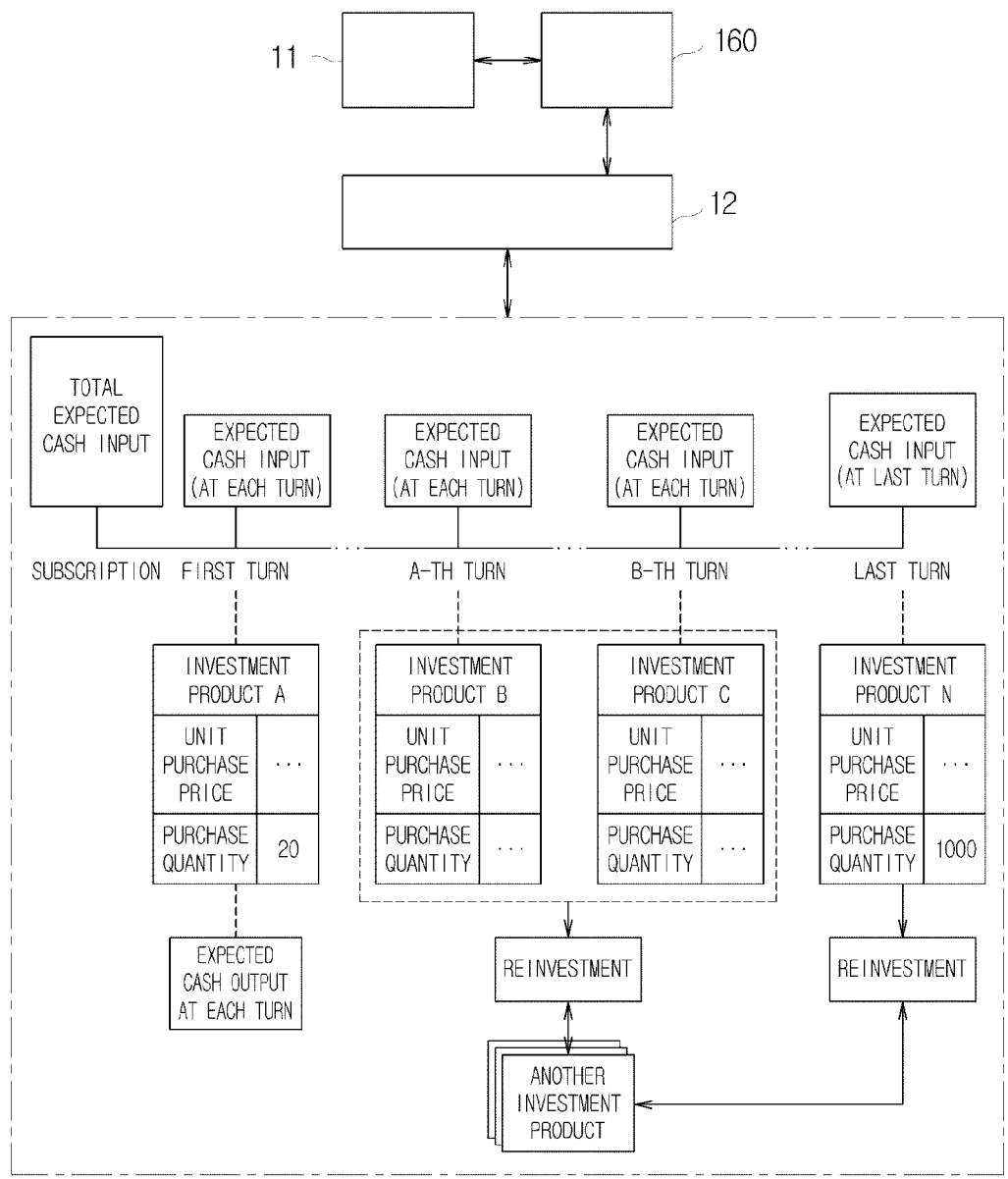
FIG. 20 schematically exemplifies an operation of a reinvestment support module according to an embodiment of the present disclosure.

The reinvestment support module 160 communicates with the client information processor 11 and, in the situation where the product invested at each/last turn is purchased/operated according to the purchase quantity of the product invested at each/last turn included in the IM operation simulation data and the expected cash output at each turn and the expected cash output at the last turn have been or are to be paid to the client, under the control of the IM operation control module, communicates with the IM management server 12 according to the client setup information transmitted from the client information processor 11 and supports such that all or part of the expected cash output at each turn or the expected cash output at the last turn may be reinvested in another investment product, as illustrated in FIG. 20.

Accordingly, the client can more flexibly reorganize his/her asset portfolio at the desired time.

Figure 21:
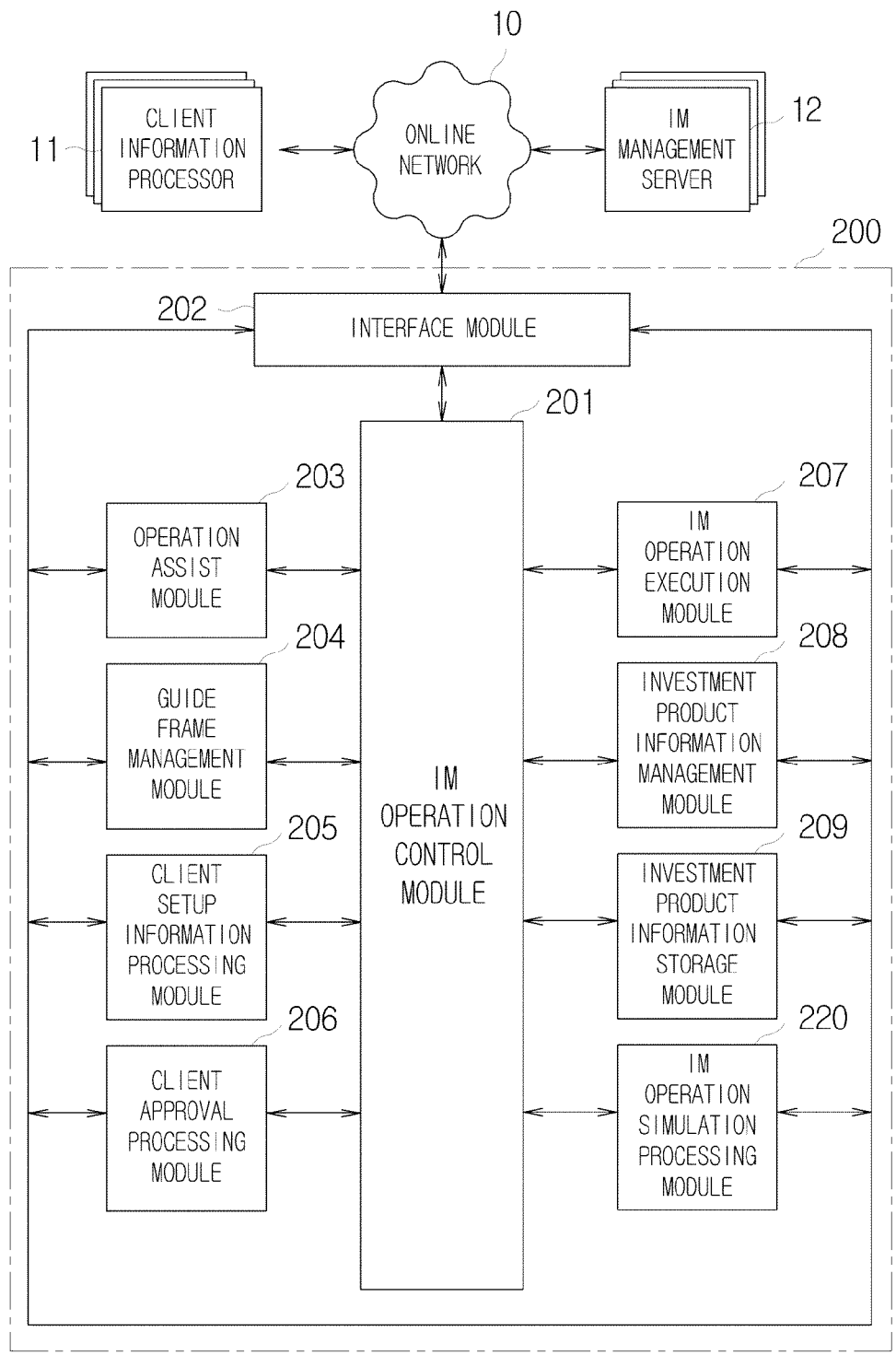
FIG. 21 schematically exemplifies an IM operating system according to another embodiment of the present disclosure.

Meanwhile, as illustrated in FIG. 21, an IM operating system 200 according to another embodiment of the present disclosure includes an IM operation control module 201, while communicating with a client information processor 11 owned by a client and communicating with an IM management server 12 that manages the client's IM in an investment product via an online network 10, an interface module 202, or the like, supporting the operation of IM according to client setup information transmitted from the client information processor 11, and an operation assist module 203, a guide frame management module 204, a client setup information processing module 205, an investment product information management module 208, an investment product information storage module 209, an IM operation simulation processing module 220, a client approval processing module 206, and an IM operation execution module 207, which are controlled by the IM operation control module 201.

Also in this case, for example, the client information processor 11 may be various computing devices such as notebook personal computer (PC), desktop PC, etc., or various mobile devices such as cellular phone, Personal Communications Service (PCS) phone, synchronous/asynchronous International Mobile Telecommunication-2000 (IMT-2000)

phone, palm PC, personal digital assistant (PDA), smartphone, Wireless Application Protocol (WAP) phone, game console (e.g., PlayStation), etc., depending on the client's situations.

The operation assist module 203 controlled by the IM operation control module 201 stably stores and manages various operation information required for the operation of IM, for example, registration information of the client, registration information of the IM management server, resources status information of the system 200, component information necessary for the computation processes by the computation modules of the system 200, text information/graphic information/setup information for generating a guide frame 302 (see FIG. 20), etc. in a storage (Of course, the above-listed operation information may be flexibly increased/decreased or changed in its kind or scope, depending on the situation of the system 200.).

Further, the operation assist module 203 manages various auxiliary procedures required for the operation of IM, for example, management of the client's log-in to the system, establishment/maintenance of communication sessions with the external computation devices 11, 12, update/management of the operation information, or the like.

Figure 22:
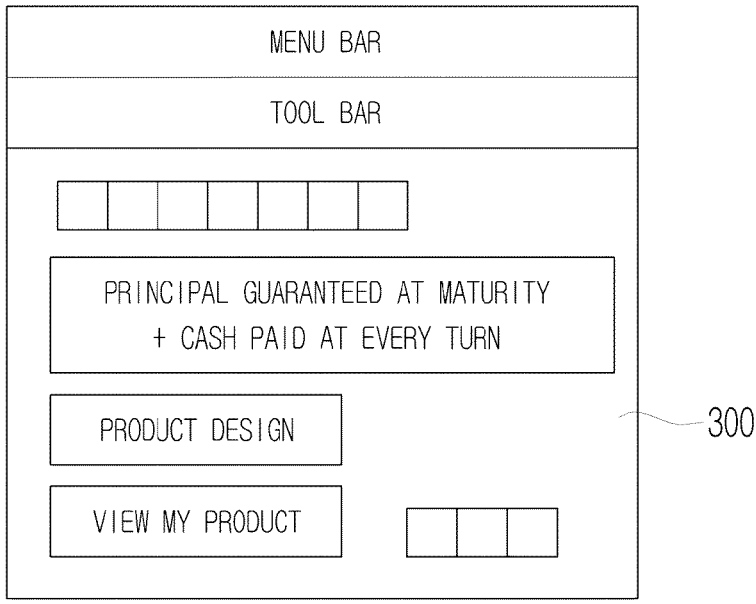
FIG. 22 schematically exemplifies a guide frame according to another embodiment of the present disclosure.

When the client logs in to the system 200 using the client information processor 11, the guide frame management module 204 controlled by the IM operation control module 201 extracts the text information, graphic information, setup information, etc. for generating the guide frame 302 by communicating with the operation assist module 203, generates the guide frame 302 using the extracted text information, graphic information, setup information, etc., and transmits the generated guide frame 302 to the client information processor 11, so that the guide frame 302 can be output/displayed on the client information processor 11, as illustrated in FIG. 22.

Figure 23:
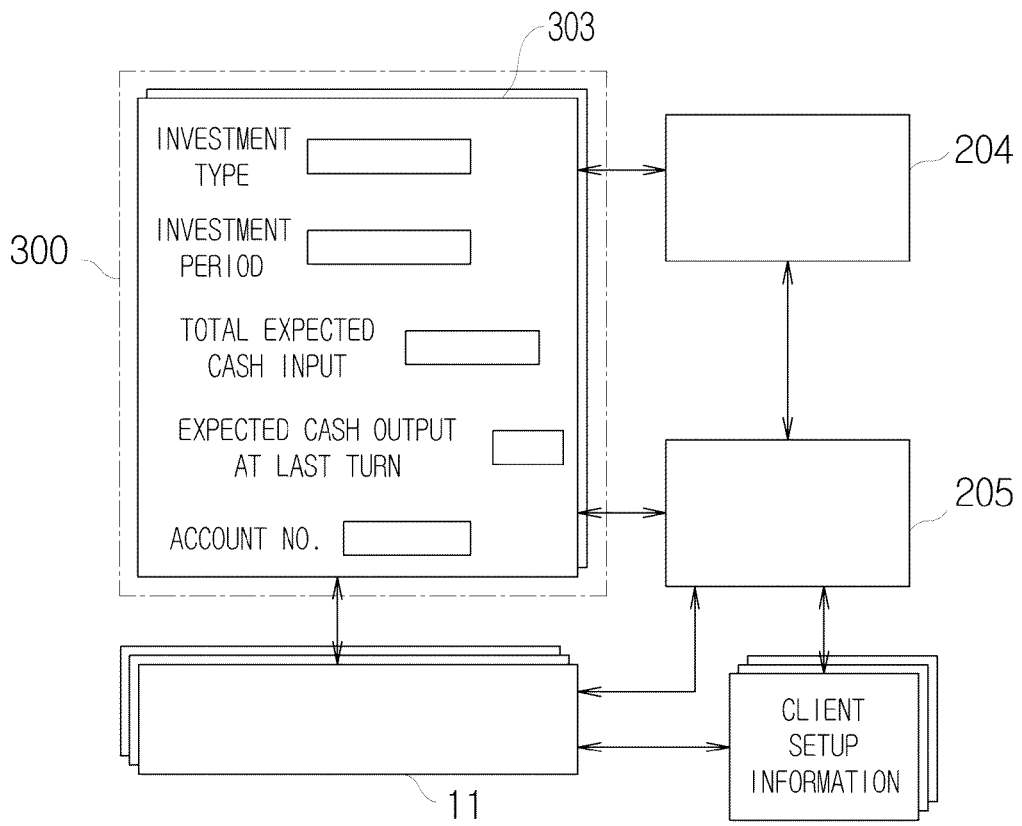
FIG. 23 schematically exemplifies an operation of a client setup information processing module according to another embodiment of the present disclosure.

In this situation, as illustrated in FIG. 23, when the client requests for operation of IM and information input support request information is transmitted from the client information processor 11, the client setup information processing module 205, under the control of the IM operation control module 201, generates an information input guide frame 303 for allowing the client to input setup information related to the operation of IM and transmits the generated information input guide frame 303 to the client information processor 11 via the interface module 202.

If the information input guide frame 303 is output/displayed on the client information processor 11, the client inputs/transmits information for each item of the information input guide frame 303. If the client setup information of the information input guide frame 303, for example, client's account information, investment type desired by the client, investment period of IM, total expected cash input, expected cash output at the last turn, etc., is transmitted from the client information processor 11, the client setup information processing module 205 receives the information via the interface module 202 and stores/manages the received information (see FIG. 23).

Figure 24:
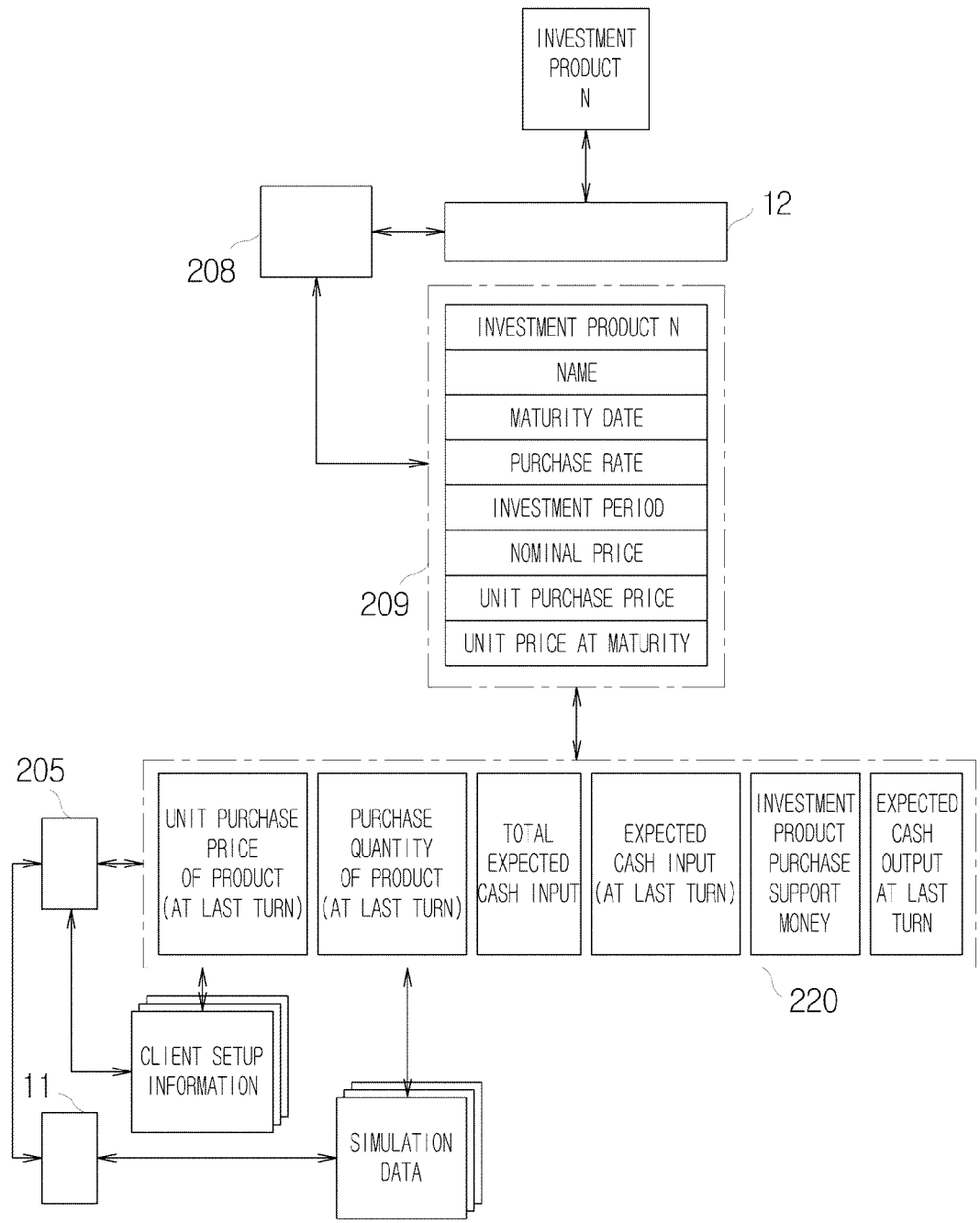
FIG. 24 schematically exemplifies an operation of an investment product information management module, an investment product information storage module, and an IM operation simulation processing module according to another embodiment of the present disclosure.

If the client setup information (e.g., client's account information, investment type desired by the client, investment period of IM, total expected cash input, expected cash output at the last turn, etc.) is received, as illustrated in FIG. 24, the investment product information management module 208 acquires information about the investment products operated by the IM management server 12 by communicating with the IM management server 12, and stably stores and manages the acquired investment product information in the investment product information storage module 209. The investment product information includes name, maturity date, purchase rate, investment period, nominal price, unit purchase price, unit price at maturity, etc. of each investment product (e.g., product N).

Figure 25:
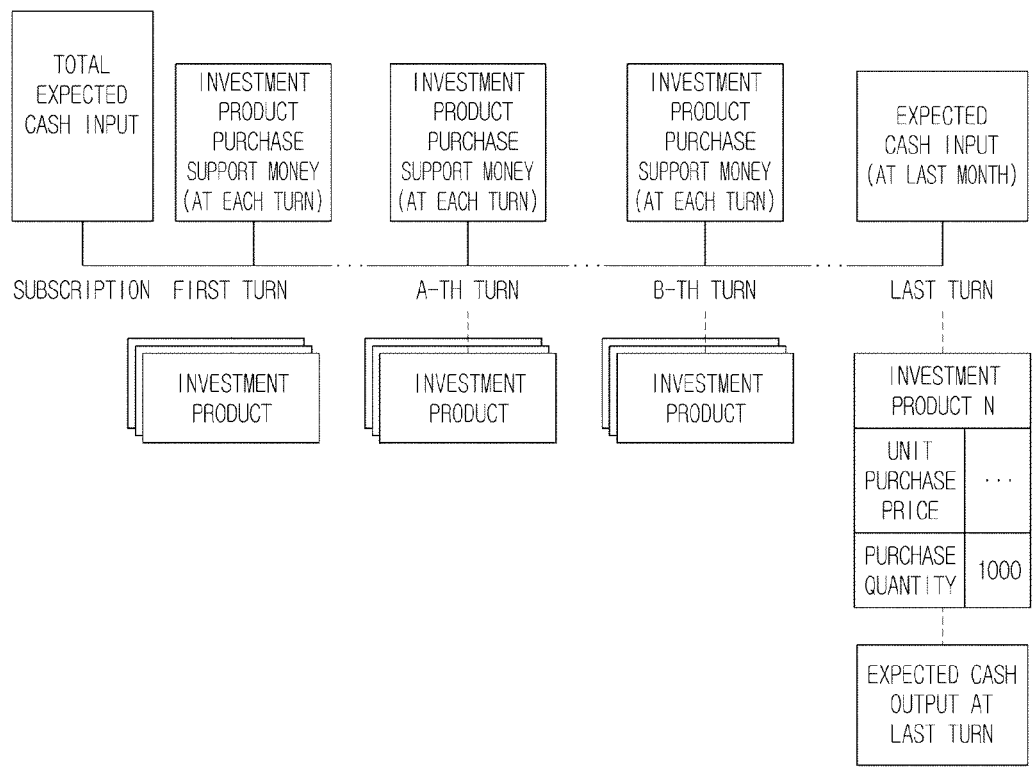
FIG. 25 schematically exemplifies a payment pattern of the investment product purchase support money and the expected cash output at the last turn according to another embodiment of the present disclosure.

In a situation where the investment product information including the name, maturity date, purchase rate, investment period, nominal price, unit purchase price, unit price at maturity, etc. of each investment product is stored and managed, as illustrated in FIGS. 24 and 25, the IM operation simulation processing module 220 selects a product invested at the last turn (e.g., product N) from among the investment products operated by the IM management server 12, according to the client setup information, computes the total expected cash input demanded on the client, the expected cash input at the last turn for the product invested at the last turn, the expected cash output at the last turn resulting from the purchase/operation of the product invested at the last turn, and the purchase quantity of the product invested at the last turn to match the expected cash output at the last turn by simulating in advance the selected product invested at the last turn according to the features of the product, computes the investment product purchase support money available for the purchase/operation of the investment product operated by the IM management server 12 by subtracting the total expected cash input and the expected cash input at the last turn, generates IM operation simulation data based on the computation result, and notifies the generated IM operation simulation data to the client information processor 11.

Figure 26:
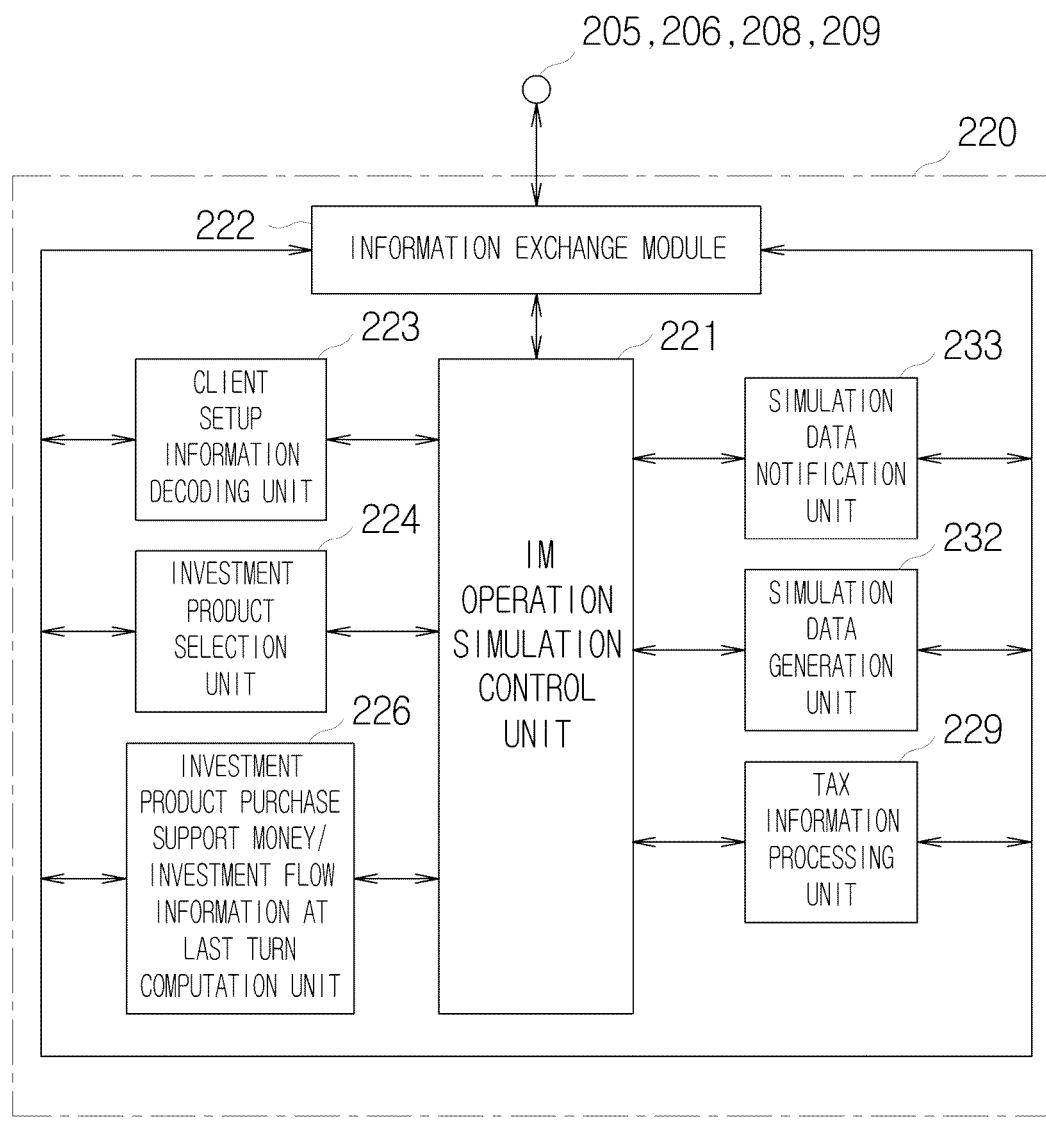
FIG. 26 schematically exemplifies a detailed configuration of an IM operation simulation processing module according to another embodiment of the present disclosure.

As illustrated in FIG. 26, the IM operation simulation processing module 220 according to another embodiment of the present disclosure includes an IM operation simulation control unit 221 controlling the overall IM operation simulation procedure, and a client setup information decoding unit 223, an investment product selection unit 224, an investment product purchase support money/investment flow information at last turn computation unit 226, a tax information processing unit 229, a simulation data generation unit 232 and a simulation data notification unit 233, which are controlled by the IM operation simulation control unit 221.

The tax information processing unit 229 generates tax information for each client on the basis of the client setup information decoded by the client setup information decoding unit 223, and provides the generated tax information to the investment product purchase support money/investment flow information at last turn computation unit 226.

Referring to the client setup information (e.g., client's account information, investment type desired by the client, investment period, total expected cash input, expected cash output at the last turn, etc.) decoded by the client setup information decoding unit 223, the investment product selection unit 224 communicates with the investment product information storage module 209, and selects the product invested at the last turn (e.g., product N) from among the investment products operated by the IM management server 12.

As illustrated in FIG. 25, the product invested at the last turn (e.g., product N) selected by the investment product selection unit 124 is an investment product whose maturity date arrives at the last turn of the investment period of IM selected by the client. For safe operation of IM, the product invested at the last turn (e.g., product N) is selected from investment products of low risk such as government bond or municipal bond.

Figure 27:
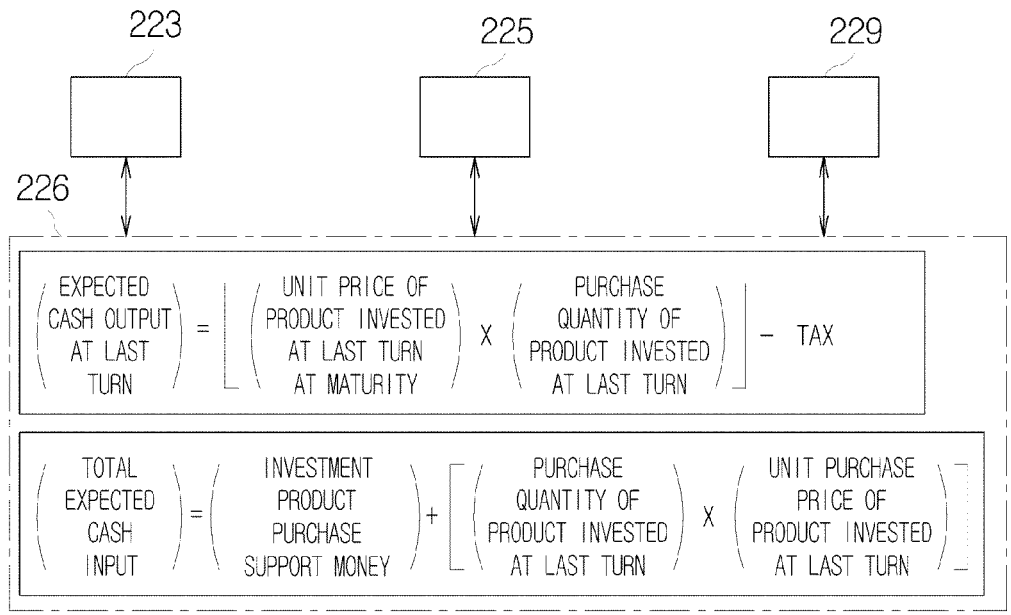
FIG. 27 schematically exemplifies an operation of an investment product purchase support money/investment flow information at last turn computation unit according to another embodiment of the present disclosure.

If the product invested at the last turn (e.g., product N) is selected, the investment product purchase support money/investment flow information at last turn computation unit 226, under the control of the IM operation simulation control unit 221, acquires the total expected cash input and the expected cash output at the last turn set the client by decoding the client setup information, and computes the purchase quantity of the product invested at the last turn from the equation {(expected cash output at the last turn)=[(unit price of the product invested at the last turn at maturity)×purchase quantity of the product invested at the last turn)]−tax}, and computes the investment product purchase support money from the equation {(total expected cash input)=(investment product purchase support money)+[(purchase quantity of the product invested at the last turn)×(unit purchase price of the product invested at the last turn)]) turn)]), as illustrated in FIG. 27.

Accordingly, the investment product purchase support money/investment flow information at last turn computation unit 226 can acquire <the investment product purchase support money available for the purchase/operation of the investment products operated by the IM management server 12, the purchase quantity of the product invested at the last turn to match the expected cash output at the last turn, the expected cash input at the last turn for the product invested at the last turn, etc. without special difficulties.

Figure 28:
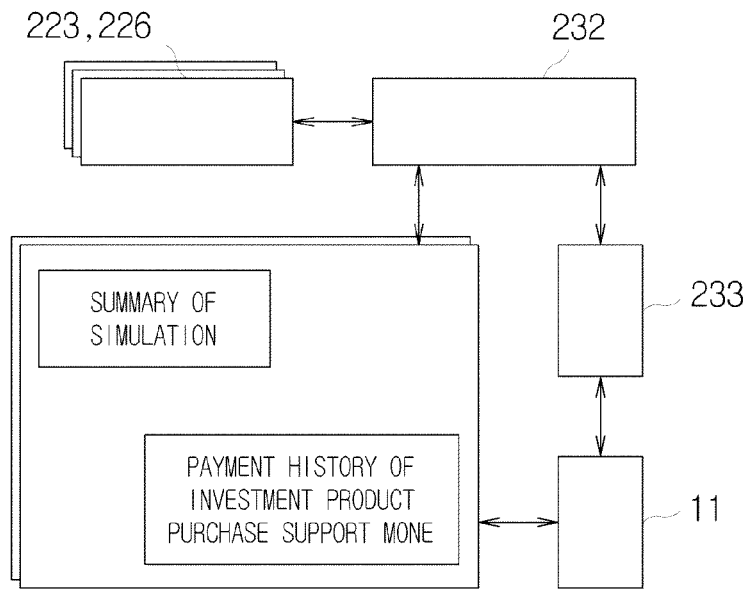
FIG. 28 schematically exemplifies an operation of a simulation data generation unit and a simulation data notification unit according to another embodiment of the present disclosure.

When such information is acquired, as illustrated in FIG. 25, the simulation data generation unit 232, under the control of the IM operation simulation control unit 221, generates an IM operation simulation data as illustrated in FIG. 28 by simulating in advance the purchase/operation of the product invested at the last turn (e.g., product N) on the basis of the features of the product invested at the turn, the expected cash output at the last turn and the total expected cash input set by the client and the purchase quantity of the product invested at the last turn, expected cash input at the last turn computed by the investment product purchase support money/investment flow information at last turn computation unit 226 and simulating the payment pattern of the investment product purchase support money computed by the investment product purchase support money/investment flow information at last turn computation unit 226 according to the time included in the client setup information.

Figure 29:
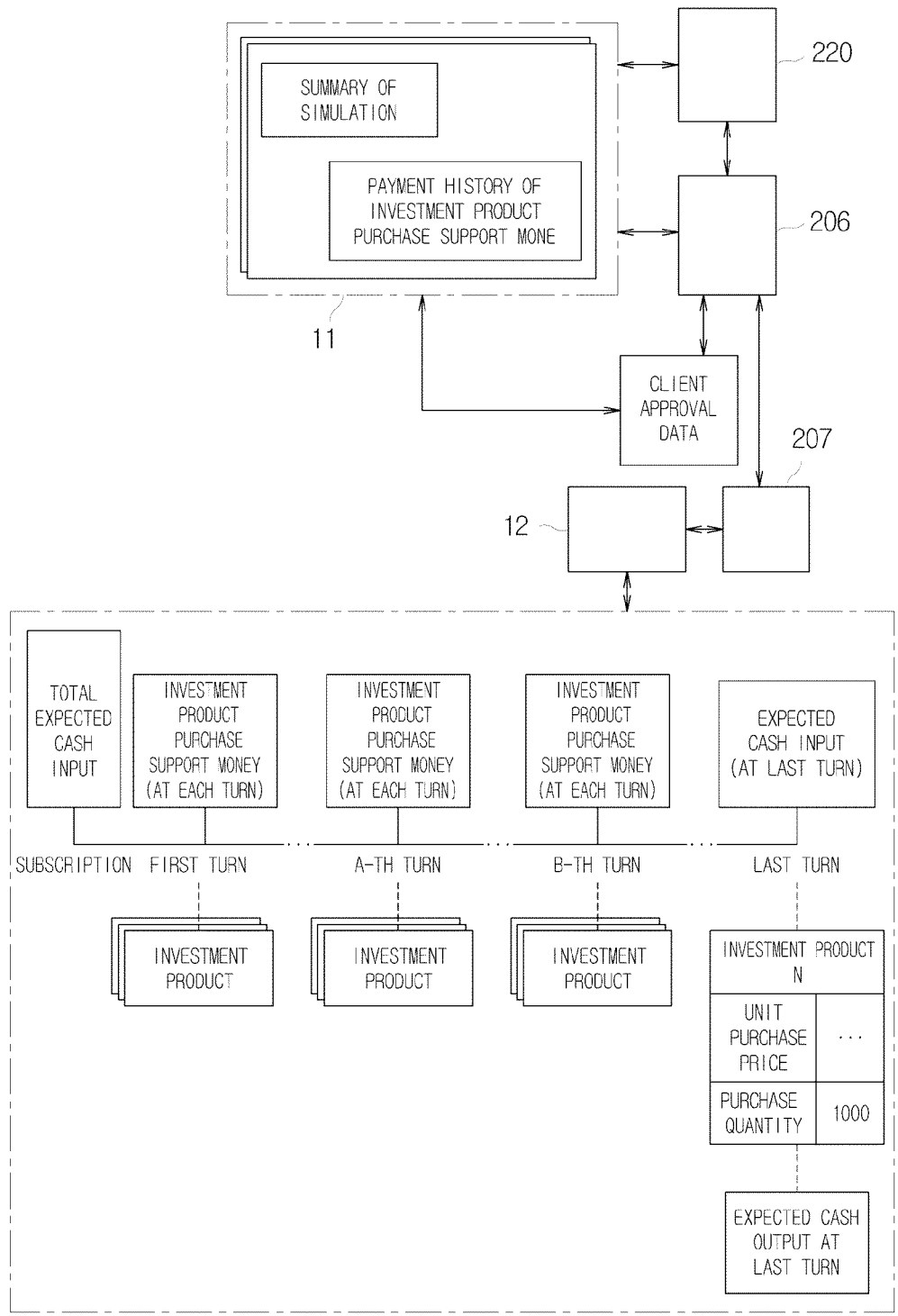
FIG. 29 schematically exemplifies an operation of a client approval processing module and an IM operation execution module according to another embodiment of the present disclosure.

If the IM operation simulation data is generated as such, the simulation data notification unit 233, under the control of the IM operation simulation control unit 221, communicates with the client information processor 11 via an information exchange module 222 or the interface module 202, and notifies the IM operation simulation data generated by the simulation data generation unit 232 to the client information processor 11, as illustrated in FIG. 29.

Then, as illustrated in FIG. 29, the client may view the IM simulation data through the client information processor 11 in various forms such as table, document, graph, figure, etc., and adequately check the operation pattern of his/her IM.

If the client agrees to the simulation result and client approval data corresponding to the IM operation simulation data is transmitted from the client information processor 11, the client approval processing module 206 (see FIG. 21) receives it via the interface module 202, and transmits the received client approval data to the IM operation execution module 207 (see FIG. 29).

After receiving the client approval data, the IM operation execution module 207 transmits the IM operation simulation data to the IM management server 12.

Figure 30:
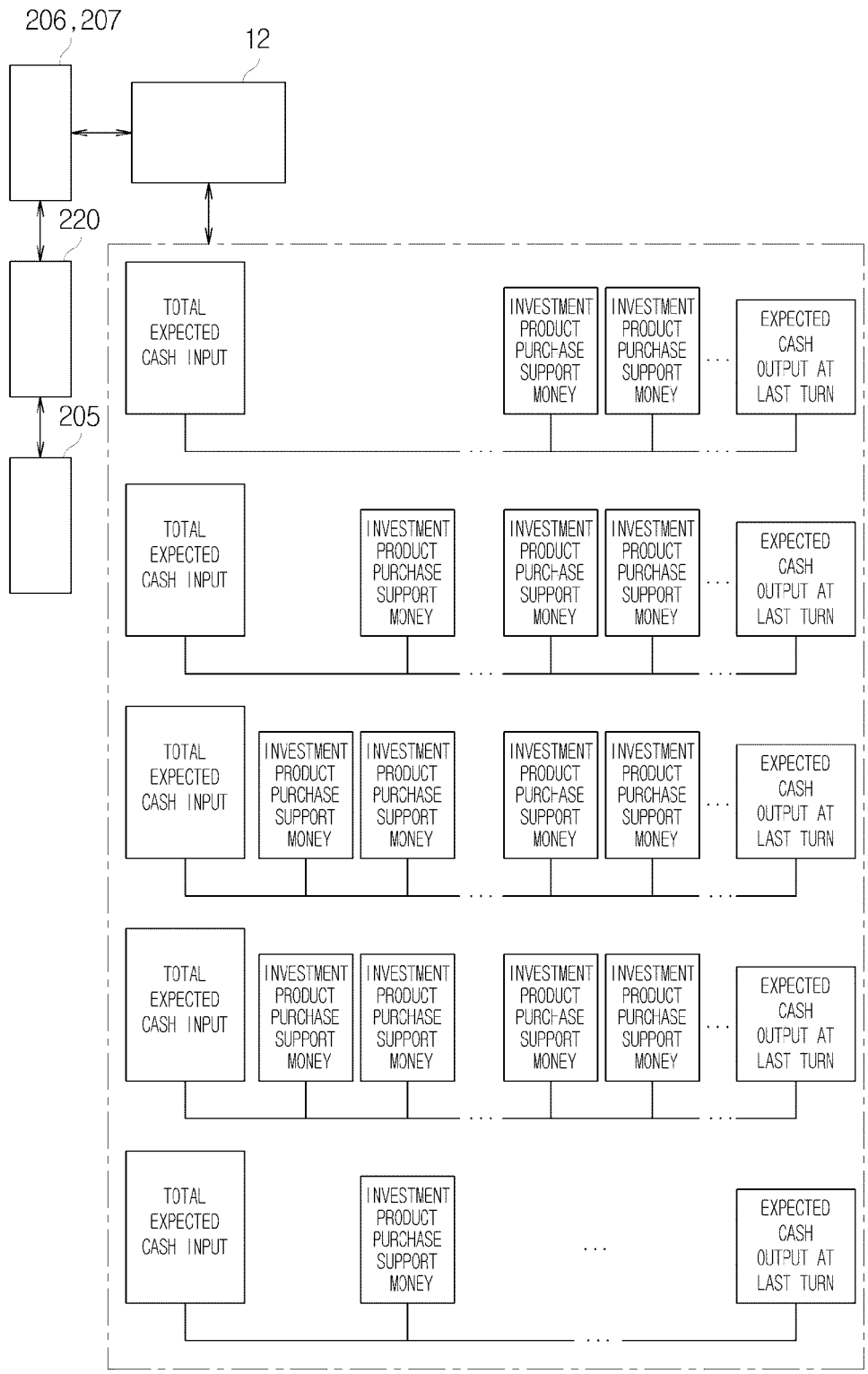
FIG. 30 schematically exemplifies a modified example of a payment pattern of the investment product purchase support money according to another embodiment of the present disclosure.

Then, as illustrated in FIGS. 29 and 30, the IM management server 12 may purchase/operate the product invested at the last turn (e.g., product N) according to the expected cash input at the last turn and the purchase quantity of the product invested at the last turn included in the IM operation simulation data. As a result, the client may be paid the expected cash output at the last turn at <the last turn of the investment period of IM>.

Also, as illustrated in FIGS. 29 and 30, after receiving the IM operation simulation data, the IM management server 12 pays the investment product purchase support money included in the IM operation simulation data to the client according to the time/amount included in the client setup information. Accordingly, the client may freely purchase and sell the investment product as he/she desires within the investment product purchase support money provided by the system (Since the client is guaranteed the principal of the IM through the expected cash output at the last turn, even when he/she loses all the investment product purchase support money due to wrongly selected investment, he/she can compensated for the psychological/physical damage resulting therefrom).

The payment pattern of the investment product purchase support money may be various according to the client setup, for example, a pattern by which an equal amount of the investment product purchase support money is paid at each turn, a pattern by which the investment product purchase support money is not paid for a predetermined grace period and a more amount of investment product purchase support money is paid at each turn after the grace period elapses, a payment pattern by which a smaller amount of investment product purchase support money is paid each turn early, but a larger amount of investment product purchase support money is paid each turn toward the last turn, a payment pattern by which a larger amount of investment product purchase support money is paid each turn early, but a smaller amount of investment product purchase support money is paid each turn toward the last turn, a payment pattern by which the amount of investment product purchase support money paid each turn gradually increases with time or a payment pattern by which the investment product purchase support money is paid at once, to name a few (see FIGS. 29 and 30).

In this situation, the client who invests and operates the IM (individual or corporate) can, for example, independently purchase/operate his/her investment product freely with the investment product purchase support money, while being guaranteed the principal of the IM through the expected cash output at the last turn. Thus, the business competitiveness of the IM manager (e.g., securities company, bank, insurance company, etc.) and the client's investment satisfaction are greatly improved.

The present disclosure will be useful in various finance fields.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The invention claimed is:

1. An investment money (IM) operating system comprising:
    an IM operation control module, while communicating with a client information processor connected to an online network, communicating with an IM management server that manages an investment of a client's IM in an investment product according to client setup information transmitted from the client information processor, and supporting an operation of IM;

an IM operation simulation processing module, under the control of the IM operation control module, selecting a product invested at each turn and a product invested at a last turn from among investment products operated by the IM management server, according to the client setup information, generating an IM operation simulation data reflecting a total expected cash input demanded on the client, an expected cash output at each turn resulting from a purchase/operation of the product invested at each turn, the expected cash output at the last turn resulting from the purchase/operation of the product invested at the last turn, a purchase quantity of the product invested at each turn to match the expected cash output at each turn, and the purchase quantity of the product invested at the last turn to match the expected cash output at the last turn, by simulating in advance the selected product invested at each/last turn according to features of the products, and notifying the generated IM operation simulation data to the client information processor; and an IM operation execution module, under the control of the IM operation control module, transmitting the IM operation simulation data to the IM management server in response to client approval data for the IM operation simulation data to cause the product invested at each/last turn to be purchased and operated according to the purchase quantity of the product invested at each/last turn included in the IM operation simulation data and to cause the client to be paid the expected cash output at each turn and the expected cash output at the last turn at each turn and at the last turn, respectively.

2. The IM operating system according to claim 1, wherein the IM operation simulation processing module comprises:

an IM operation simulation control unit controlling an IM operation simulation procedure;

an expected cash input computation unit, under the control of the IM operation simulation control unit, acquiring the expected cash output at the last turn and the expected cash output at each turn set by the client by decoding the client setup information, and computing the purchase quantity of the product invested at each turn to match the expected cash output at each turn, the purchase quantity of the product invested at the last turn to match the expected cash output at the last turn and the total expected cash input demanded on the client from the equations {(expected cash output at each turn)=[(unit price of the product invested at each turn at maturity)×(purchase quantity of the product invested at each turn)]−tax}, {(expected cash output at the last turn)=[(unit price of the product invested at the last turn at maturity)×(purchase quantity of the product invested at the last turn)]−tax} and {(total expected cash input)=[(purchase quantity of the product invested at each turn)×(unit purchase price of the product invested at each turn)]+[(purchase quantity of the product invested at the last turn)×(unit purchase price of the product invested at the last turn)]};

a simulation data generation unit, under the control of the IM operation simulation control unit, generating the IM operation simulation data by simulating in advance the purchase/operation of the product invested at each/last turn on the basis of the features of the product invested at each/last turn, the expected cash output at the last turn and the expected cash output at each turn set by the client and the purchase quantity of the product invested at each turn, the purchase quantity of the product invested at the last turn, the expected cash input at each/last turn, and the total expected cash input computed by the expected cash input computation unit for each turn and the last turn; and a simulation data notification unit, under the control of the IM operation simulation control unit, notifying the IM operation simulation data generated by the simulation data generation unit to the client information processor.

3. The IM operating system according to claim 1, wherein the IM operation simulation processing module comprises:

an IM operation simulation control unit controlling an IM operation simulation procedure;

an investment flow information at last turn computation unit, under the control of the IM operation simulation control unit, acquiring the total expected cash input and the expected cash output at each turn set by the client by decoding the client setup information, and computing the purchase quantity of the product invested at each turn to match the expected cash output at each turn, the purchase quantity of the product invested at the last turn to match the expected cash output at the last turn and the expected cash output at the last turn resulting from the purchase/operation of the product invested at the last turn from the equations {(expected cash output at each turn)=[(unit price of the product invested at each turn at maturity)×(purchase quantity of the product invested at each turn)]−tax}, {[(purchase quantity of the product invested at the last turn)×(unit purchase price of the product invested at the last turn)]=(total expected cash input)−[(purchase quantity of the product invested at each turn)×(unit purchase price of the product invested at each turn)]} and {(expected cash output at the last turn)=[(unit price of the product invested at the last turn at maturity)×(purchase quantity of the product invested at the last turn)]−tax};

a simulation data generation unit, under the control of the IM operation simulation control unit, generating the IM operation simulation data by simulating in advance the purchase/operation of the product invested at each/last turn on the basis of the features of the product invested at each/last turn, the total expected cash input and the expected cash output at each turn set by the client and the purchase quantity of the product invested at each turn, the purchase quantity of the product invested at the last turn, and the expected cash output at the last turn computed by the investment flow information at last turn computation unit for each turn and the last turn; and a simulation data notification unit, under the control of the IM operation simulation control unit, notifying the IM operation simulation data generated by the simulation data generation unit to the client information processor.

4. The IM operating system according to claim 1, wherein the IM operation simulation processing module comprises:

an IM operation simulation control unit controlling an IM operation simulation procedure;

an investment flow information at each turn computation unit, under the control of the IM operation simulation control unit, acquiring the total expected cash input and the expected cash output at the last turn set by the client by decoding the client setup information, and computing the purchase quantity of the product invested at each turn to match the expected cash output at each turn, the purchase quantity of the product invested at the last turn to match the expected cash output at the last turn and the expected cash output at each turn resulting from the purchase/operation of the product invested at each turn from the equations {(expected cash output at the last turn)=[(unit price of the product invested at the last turn at maturity)×(purchase quantity of the product invested at the last turn)]−tax}, {[(purchase quantity of the product invested at each turn)×(unit purchase price of the product invested at each turn)]=(total expected cash input)−[(purchase quantity of the product invested at the last turn)×(unit purchase price of the product invested at the last turn)]} and {(expected cash output at each turn)= [(unit price of the product invested at each turn at maturity)×(purchase quantity of the product invested at each turn)]−tax};

a simulation data generation unit, under the control of the IM operation simulation control unit, generating the IM operation simulation data by simulating in advance the purchase/operation of the product invested at each/last turn on the basis of the features of the product invested at each/last turn, the total expected cash input and the expected cash output at the last turn set by the client and the purchase quantity of the product invested at each turn, the purchase quantity of the product invested at the last turn, and the expected cash output at each turn computed by the investment flow information at each turn computation unit for each turn and the last turn; and a simulation data notification unit, under the control of the IM operation simulation control unit, notifying the IM operation simulation data generated by the simulation data generation unit to the client information processor.

5. The IM operating system according to claim 1, wherein the IM operation simulation processing module comprises:

an IM operation simulation control unit controlling an IM operation simulation procedure;

an investment flow information at each turn computation engine, under the control of the IM operation simulation control unit, acquiring the total expected cash input and the expected cash output at the last turn set by the client by decoding the client setup information, computing the purchase quantity of the product invested at the last turn to match the expected cash output at the last turn and the basis amount of the expected cash output at each turn for computing the expected cash output at each turn resulting from the purchase/operation of the product invested at each turn from the equations {(expected cash output at the last turn)=[(unit price of the product invested at the last turn at maturity)×(purchase quantity of the product invested at the last turn)]−tax}, {(expected cash input at the last turn)=(purchase quantity of the product invested at the last turn)×(unit purchase price of the product invested at the last turn)} and {(basis amount of the expected cash output at each turn)=[(total expected cash input)−(expected cash input at the last turn)]÷[(investment period)−(grace period)]}, computing the maximum/minimum of the expected cash output at each turn by increasing/decreasing the computed basis amount of the expected cash output at each turn, computing the maximum/minimum of the total expected cash input from the equations {(maximum of the expected cash output at each turn)=[(unit price of the product invested at each turn at maturity)×(maximum of the purchase quantity of the product invested at each turn)]−tax}, {(minimum of the expected cash output at each turn)= [(unit price of the product invested at each turn at maturity)×(minimum of the purchase quantity of the product invested at each turn)]−tax}, {(maximum of the total expected cash input)=[(maximum of the purchase quantity of the product invested at each turn)×(unit purchase price of the product invested at each turn)]+[(purchase quantity of the product invested at the last turn)×(unit purchase price of the product invested at the last turn)] and [(minimum of the total expected cash input)=[(minimum of the purchase quantity of the product invested at each turn)×(unit purchase price of the product invested at each turn)]+[(purchase quantity of the product invested at the last turn)×(unit purchase price of the product invested at the last turn)], determining whether the computed maximum/minimum of the total expected cash input satisfy the relationship {(minimum of the total expected cash input)≦(total expected cash input set by the client)≦(maximum of the total expected cash input)}, if the maximum/minimum of the total expected cash input satisfy the relationship {(maximum of the total expected cash input)≦(total expected cash input set by the client)≦(minimum of the total expected cash input)}, computing the mean of the expected cash output at each turn which is the mean of the maximum/minimum of the expected cash output at each turn, computing the mean of the total expected cash input from the equations [(mean of the expected cash output at each turn)=[(unit price of the product invested at each turn at maturity)×(mean of the purchase quantity of the product invested at each turn)]−tax} and {(mean of the total expected cash input)=[(mean of the purchase quantity of the product invested at each turn)×(unit purchase price of the product invested at each turn)]+[(purchase quantity of the product invested at the last turn)×(unit purchase price of the product invested at the last turn)]}, determining whether the computed mean of the total expected cash input satisfies the relationship {(mean of the total expected cash input)≈(total expected cash input set by the client)}, if the computed mean of the total expected cash input satisfies the relationship {(mean of the total expected cash input)≈(total expected cash input set by the client)}, deciding the mean of the expected cash output at each turn as the expected cash output at each turn resulting from the purchase/operation of the product invested at each turn, and computing the purchase quantity of the product invested at each turn to match the expected cash output at each turn from the equation {(expected cash output at each turn)=[(unit price of the product invested at each turn at maturity)× (purchase quantity of the product invested at each turn)]−tax};

a simulation data generation unit, under the control of the IM operation simulation control unit, generating the IM operation simulation data by simulating in advance the purchase/operation of the product invested at each/last turn on the basis of the features of the product invested at each/last turn, the total expected cash input and the expected cash output at the last turn set by the client and the purchase quantity of the product invested at each turn, the purchase quantity of the product invested at the last turn, and the expected cash output at each turn computed by the investment flow information at each turn computation engine for each turn and the last turn; and a simulation data notification unit, under the control of the IM operation simulation control unit, notifying the IM operation simulation data generated by the simulation data generation unit to the client information processor.

6. The IM operating system according to claim 5, wherein, if it is determined that the maximum/minimum of the total expected cash input do not satisfy the relationship {(minimum of the total expected cash input)≦(total expected cash input set by the client)≦(maximum of the total expected cash input)}, the investment flow information at each turn computation engine increases/decreases the basis amount of the expected cash output at each turn once again, computes another maximum/minimum of the expected cash output at each turn, computes another maximum/minimum of the total expected cash input from the equations {(maximum of the expected cash output at each turn)=[(unit price of the product invested at each turn at maturity)×(maximum of the purchase quantity of the product invested at each turn)]−tax}, {(minimum of the expected cash output at each turn)=[(unit price of the product invested at each turn at maturity)×(minimum of the purchase quantity of the product invested at each turn)]−tax}, [(maximum of the total expected cash input)=(maximum of the purchase quantity of the product invested at each turn)×(unit purchase price of the product invested at each turn)]+[(purchase quantity of the product invested at the last turn)×(unit purchase price of the product invested at the last turn)] and {(minimum of the total expected cash input)= [(minimum of the purchase quantity of the product invested at each turn)×(unit purchase price of the product invested at each turn)]+[(purchase quantity of the product invested at the last turn)×(unit purchase price of the product invested at the last turn)]}, and determines again whether the computed another maximum/minimum of the total expected cash input satisfy the relationship {(minimum of the total expected cash input)≦(total expected cash input set by the client)≦(maximum of the total expected cash input)}.

7. The IM operating system according to claim 5, wherein, if it is determined that the mean of the total expected cash input does not satisfy the relationship {(mean of the total expected cash input)≈(total expected cash input set by the client)}, the investment flow information at each turn computation engine computes another mean of the expected cash output at each turn which is the mean of the maximum of the expected cash output at each turn and the mean of the expected cash output at each turn, computes another mean of the total expected cash input from the equations {(mean of the expected cash output at each turn)=[(unit price of the product invested at each turn at maturity)×(mean of the purchase quantity of the product invested at each turn)]−tax} and {(mean of the total expected cash input)=[(mean of the purchase quantity of the product invested at each turn)×(unit purchase price of the product invested at each turn)]+[(purchase quantity of the product invested at the last turn)×(unit purchase price of the product invested at the last turn)]}, and determines again whether the computed another mean of the total expected cash input satisfies the relationship {(mean of the total expected cash input)≈(total expected cash input set by the client)}.

8. The IM operating system according to claim 5, wherein, if it is determined that the mean of the total expected cash input does not satisfy the relationship {(mean of the total expected cash input)≈(total expected cash input set by the client)}, the investment flow information at each turn computation engine computes another mean of the expected cash output at each turn which is the mean of the minimum of the expected cash output at each turn and the mean of the expected cash output at each turn, computes another mean of the total expected cash input from the equations {(mean of the expected cash output at each turn)=[(unit price of the product invested at each turn at maturity)×(mean of the purchase quantity of the product invested at each turn)]−tax}, and {(mean of the total expected cash input)=[(mean of the purchase quantity of the product invested at each turn)×(unit purchase price of the product invested at each turn)]+[(purchase quantity of the product invested at the last turn)×(unit purchase price of the product invested at the last turn)]}, and determines again whether the computed another mean of the total expected cash input satisfies the relationship {(mean of the total expected cash input)≈(total expected cash input set by the client)}.

9. The IM operating system according to claim 5, wherein the IM operation simulation processing module further comprises: a rate of return on investment computation unit, under the control of the IM operation simulation control unit, computing the rate of return on investment corresponding to the total expected cash input from the equation {(rate of return on investment)=[(expected cash output at the last turn+expected cash output at each turn)÷(total expected cash input)−1]× [(365÷investment period of total expected cash input)×100]), and transmitting the computed rate of return on investment to the simulation data generation unit, to reflect the rate of return on investment corresponding to the total expected cash input in the IM operation simulation data.

10. The IM operating system according claim 1, which further comprises: a payment pattern adjustment module, under the control of the IM operation control module, correcting/adjusting the amount or time of payment of the expected cash output at the last turn or the expected cash output at each turn included in the IM operation simulation data according to the client setup information, to provide a payment pattern of the expected cash output at each turn or the expected cash output at the last turn paid to the client corresponding to the client setup information.

11. The IM operating system according to claim 1, which further comprises: an in-advance trade support module, in the situation where the product invested at each/last turn is purchased/operated according to the purchase quantity of the product invested at each/last turn included in the IM operation simulation data and the expected cash output at each turn and the expected cash output at the last turn have been or are to be paid to the client, under the control of the IM operation control module, communicating with the IM management server according to the client setup information transmitted from the client information processor and supporting such that all or part of the product invested at each/last turn may be traded in advance before the each turn or the last turn arrives.

12. The IM operating system according to claim 1, which further comprises: a reinvestment support module, in the situation where the product invested at each/last turn is purchased/operated according to the purchase quantity of the product invested at each/last turn included in the IM operation simulation data and the expected cash output at each turn and the expected cash output at the last turn have been or are to be paid to the client, under the control of the IM operation control module, communicating with the IM management server according to the client setup information transmitted from the client information processor and supporting such that all or part of the expected cash output at each turn or the expected cash output at the last turn may be reinvested in another investment product.

* * * * *